(12) United States Patent
Murakami et al.

(10) Patent No.: US 9,374,319 B2
(45) Date of Patent: Jun. 21, 2016

(54) OPERATION CONTENT EVALUATION SYSTEM AND STORAGE MEDIUM

(71) Applicant: Hitachi, Ltd., Tokyo (JP)

(72) Inventors: Hitoshi Murakami, Tokyo (JP); Hidenobu Muramatsu, Tokyo (JP); Kouji Masuda, Tokyo (JP); Masatoshi Yoshida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 215 days.

(21) Appl. No.: 14/239,609

(22) PCT Filed: May 17, 2013

(86) PCT No.: PCT/JP2013/063773
§ 371 (c)(1),
(2) Date: Feb. 19, 2014

(87) PCT Pub. No.: WO2014/184946
PCT Pub. Date: Nov. 20, 2014

(65) Prior Publication Data
US 2015/0319104 A1    Nov. 5, 2015

(51) Int. Cl.
*G06F 15/173* (2006.01)
*H04L 12/911* (2013.01)
(Continued)

(52) U.S. Cl.
CPC ...... *H04L 47/82* (2013.01); *G06F 9/44* (2013.01); *G06F 9/445* (2013.01); *G06Q 50/10* (2013.01); *H04L 43/08* (2013.01)

(58) Field of Classification Search
CPC ........... G06F 9/44; G06F 9/445; G04L 43/08; G04L 47/82; G06Q 50/10
USPC ........................................................ 709/226
See application file for complete search history.

(56) References Cited

U.S. PATENT DOCUMENTS

| 7,313,620 B2 * | 12/2007 | Odhner ........ G06Q 10/06 709/224 |
| 2002/0091994 A1 * | 7/2002 | McCready ...... G06Q 10/04 717/124 |

(Continued)

FOREIGN PATENT DOCUMENTS

| JP | 2004-227359 A | 8/2004 |
| JP | 2007-026391 A | 2/2007 |

(Continued)

OTHER PUBLICATIONS

PCT International Search Report and Written Opinion on application PCT/JP2013/063773 mailed Jul. 2, 2013; 5 pages.

(Continued)

*Primary Examiner* — Joseph Greene
(74) *Attorney, Agent, or Firm* — Foley & Lardner LLP

(57) ABSTRACT

An operation content evaluation system for evaluating an operation content for controlling computer resources, the operation content evaluation system including: a content site including a content management server for distributing operation contents for controlling computer resources; and a user site including a content evaluation server for evaluating one of the operation contents and computer resources, wherein the content management server holds catalogs associated one-to-one with the operation contents and each of the catalogs includes prerequisites for executing an operation content and evaluation elements for the operation content, wherein the content evaluation server holds configuration information collected from the computer resources in resource management information, and wherein the content evaluation server acquires the catalogs from the content management server, selects a catalog associated with the operation content to be evaluated from the catalogs, and evaluates the operation content by comparing the selected catalog with the resource management information.

9 Claims, 28 Drawing Sheets

(51) Int. Cl.
*H04L 12/26* (2006.01)
*G06F 9/44* (2006.01)
*G06F 9/445* (2006.01)
*G06Q 50/10* (2012.01)

(56) References Cited

U.S. PATENT DOCUMENTS

| | | |
|---|---|---|
| 2004/0148485 A1 | 7/2004 | Suzuki |
| 2007/0016750 A1 | 1/2007 | Suzuki |
| 2007/0214030 A1 | 9/2007 | Shear et al. |
| 2009/0217247 A1* | 8/2009 | Kamigata ............ G06F 11/3612 |
| | | 717/131 |
| 2010/0011106 A1* | 1/2010 | Ohashi .................... H04L 12/24 |
| | | 709/226 |
| 2012/0299727 A1* | 11/2012 | Newman ............ G05B 23/0267 |
| | | 340/540 |

FOREIGN PATENT DOCUMENTS

| | | | |
|---|---|---|---|
| JP | 2007026391 | * 2/2007 | .............. G06F 15/00 |
| JP | 2010-272121 A | 12/2010 | |

OTHER PUBLICATIONS

PCT International Search Report on application PCT/JP2013/063773 mailed Jul. 2, 2013.

PCT Written Opinion on application PCT/JP2013/063773 mailed Jul. 2, 2013.

* cited by examiner

410 CONTENT MANAGEMENT TABLE

| CONTENT ID | CATALOG ID | DESCRIPTION OF CONTENT |
|---|---|---|
| Contents_ProviderA_CreateLUAnd DataStore_0100 | Catalog_ProviderA_CreateLUAnd DataStore_0100 | ADD VIRTUAL SERVER (CREATE LU/CREATE DATA STORE) |
| Contents_ProviderB_CreateLUAnd DataStore_0100 | Catalog_ProviderB_CreateLUAnd DataStore_0100_ | ADD VIRTUAL SERVER (CREATE LU/CREATE DATA STORE) |
| Contents_ProviderC_CreateLUAnd DataStore_0200 | Catalog_ProviderC_CreateLUAnd DataStore_0100_ | ADD VIRTUAL SERVER (CREATE LU/CREATE DATA STORE) |

420 CATALOGS

| CATALOG ID | CONTENT ID | DESCRIPTION OF CONTENT | EVALUATION ELEMENTS |
|---|---|---|---|
| Catalog_ProviderA_CreateLU AndDataStore_0100 | Contents_ProviderA_CreateLU AndDataStore_0100 | ADD VIRTUAL SERVER (CREATE LU/CREATE DATA STORE) | Table_A |
| Catalog_ProviderB_CreateLU AndDataStore_0100_ | Contents_ProviderB_CreateLU AndDataStore_0100 | ADD VIRTUAL SERVER (CREATE LU/CREATE DATA STORE) | Table_B |
| Catalog_ProviderC_CreateLU AndDataStore_0100_ | Contents_ProviderC_CreateLU AndDataStore_0200 | ADD VIRTUAL SERVER (CREATE LU/CREATE DATA STORE) | Table_C |

Table_A — 4204A EVALUATION ELEMENTS

| RESOURCE INFORMATION | PREREQUISITE EVALUATION FORMULA | PREREQUISITES | | | EVALUATION POINT | COMMAND LIST | TIME INFORMATION |
|---|---|---|---|---|---|---|---|
| | | 1 | 2 | 3 | | | |
| VIRTUALIZATION MANAGEMENT SERVER | 1*(2+3) | Virtual Machine Management Software | Ver. 5.0 | Ver. 4.1 | | Connect-VirtualMashineManager Get-VMHost Get-VMHostStrage New-DataStore Set-DataStore Get-ScsiLun Get-ScsiLunPath Get-VMHostHba Set-ScsiLunPath | 10 min |
| VIRTUAL SERVER | 1*(2+3) | Virtual Server Software | Ver. 5.0 | Ver. 4.1 | | | |
| STORAGE MANAGEMENT SERVER | 1*2 | Storage Management Software | ≧Ver. 07-00 | | | GetStorageArray AddVirtualVolume | 20 min |
| STORAGE SYSTEM | 1+2 | Storage System XXX | Storage System YYY | | 1 | | |
| 42011 | 42012 | 42013 | 42014 | 42015 | 42016 | 42017 | 42018 |

4204B EVALUATION ELEMENTS

Table_B

| RESOURCE INFORMATION | PREREQUISITE EVALUATION FORMULA | PREREQUISITES | | | EVALUATION POINT | COMMAND LIST | TIME INFORMATION |
|---|---|---|---|---|---|---|---|
| | | 1 | 2 | 3 | | | |
| VIRTUALIZATION MANAGEMENT SERVER | 1*(2+3) | Virtual Machine Management Software | Ver. 5.0 | Ver. 4.1 | | Connect-VirtualMashineManager<br>Get-VMHostList<br>Get-VMHostStrageList<br><br>Connect-VirtualMashineManager<br>Get-VMHost<br>Get-VMHostStrage<br>New-DataStore<br>Set-DataStore<br>Get-ScsiLun<br>Get-ScsiLunPath<br>Get-VMHostHba<br>Set-ScsiLunPath | 20 min |
| VIRTUAL SERVER | 1*(2+3) | Virtual Server Software | Ver. 5.0 | Ver. 4.1 | 1 | | |
| STORAGE MANAGEMENT SERVER | 1*2 | Storage Management Software | ≧07-00 | | | ScanStorageSubSystem<br>GetStorageArray<br>AddVirtualVolume | 10 min |
| STORAGE SYSTEM | 1+2 | Storage System XXX | Storage System YYY | | | | |
| 42011 | 42012 | 42013 | 42014 | 42015 | 42016 | 42017 | 42018 |

4204C EVALUATION ELEMENTS

Table_C

| RESOURCE INFORMATION | PREREQUISITE EVALUATION FORMULA | PREREQUISITES | | | EVALUATION POINT | COMMAND LIST | TIME INFORMATION |
|---|---|---|---|---|---|---|---|
| | | 1 | 2 | 3 | | | |
| VIRTUALIZATION MANAGEMENT SERVER | 1*2 | Virtual Machine Management Software | Ver. 5.0 | | | Connect-VirtualMashineManager<br>Get-VMHost<br>Get-VMHostStrage<br>New-DataStore<br>Set-DataStore<br>Get-ScsiLun<br>Get-ScsiLunPath<br>Get-VMHostHba<br>Set-ScsiLunPath | 10 min |
| VIRTUAL SERVER | 1*2 | Virtual Server Software | Ver. 6.0 | | | | |
| STORAGE MANAGEMENT SERVER | 1*2 | Storage Management Software | ≧Ver. 07-00 | | | ScanStorageSubSystem<br>GetStorageArray<br>AddVirtualVolume | 10 min |
| STORAGE SYSTEM | 1+2 | Storage System XXX | Storage System YYY | | 1 | | |
| 42011 | 42012 | 42013 | 42014 | 42015 | 42016 | 42017 | 42018 |

Fig. 13

700 RESOURCE MANAGEMENT TABLE (USER SITE A)

| RESOURCE ID | RESOURCE TYPE | RESOURCE INFORMATION | COMMAND HISTORY | LOG INFORMATION | UPDATE TIME AND DATE |
|---|---|---|---|---|---|
| 00000001 | VIRTUALIZATION MANAGEMENT SERVER | Virtual Machine Management Software Ver. 5.0 | ...<br>Connect-VirtualMashineManager<br>Get-VMHost<br>Get-VMHostStrage<br>New-DataStore<br>Set-DataStore<br>Get-ScsiLun<br>Get-ScsiLunPath<br>Get-VMHostHba<br>Set-ScsiLunPath<br>... | ...<br>10:00:00 connect...<br>10:02:00 Get-VMHost...<br>10:04:00 Get-VMHostStrage...<br>10:07:00 new DataStore...<br>10:10:00 Set DataStore...<br>10:15:00 Get-ScsiLun...<br>10:17:00 Get-ScsiLunPath...<br>10:22:00 Get-VMHostHba...<br>10:30:00 Set -ScsiLunPath...<br>... | 2013/01/01 |
| 00000002 | VIRTUAL SERVER | Virtual Server Software Ver. 5.0 | | | 2013/01/01 |
| 00000003 | STORAGE MANAGEMENT SERVER | Storage Management Software 7.1 | ...<br>GetStorageArray<br>AddVirtualVolume<br>... | ...<br>11:00:00 GetStorageArray<br>11:20:00 AddVirtualVolume<br>... | 2012/12/01 |
| 00000004 | STORAGE SYSTEM | Storage System XXX | | | 2012/12/01 |
| 701 | 702 | 703 | 704 | 705 | 706 |

Fig. 14

700 RESOURCE MANAGEMENT TABLE (USER SITE B)

| RESOURCE ID | RESOURCE TYPE | RESOURCE INFORMATION | COMMAND HISTORY | LOG INFORMATION | UPDATE TIME AND DATE |
|---|---|---|---|---|---|
| 00000001 | VIRTUALIZATION MANAGEMENT SERVER | Virtual Machine Management Software Ver. 5.0 | ...<br>Connect-VirtualMashineManager<br>Get-VMHostList<br>Get-VMHostStrageList<br>...<br>Connect-VirtualMashineManager<br>Get-VMHost<br>Get-VMHostStrage<br>New-DataStore<br>Set-DataStore<br>Get-ScsiLun<br>Get-ScsiLunPath<br>Get-VMHostHba<br>Set-ScsiLunPath<br>... | ...<br>10:00:00 connect...<br>10:02:00 Get-VMHostList...<br>10:04:30 Get-VMHostStrageList...<br>...<br>10:20:00 connect...<br>10:23:00 Get-VMHost...<br>10:26:00 Get-VMHostStrage...<br>10:30:00 new DataStore...<br>10:33:00 Set DataStore...<br>10:38:00 Get-ScsiLun...<br>10:43:00 Get-ScsiLunPath...<br>10:47:00 Get-VMHostHba...<br>10:50:00 Set-ScsiLunPath...<br>... | 2013/01/01 |
| ... | | | | | |

| RESOURCE ID | RESOURCE TYPE | RESOURCE INFORMATION | ... | COMMAND HISTORY | LOG INFORMATION | UPDATE TIME AND DATE |
|---|---|---|---|---|---|---|
| 00000002 | VIRTUAL SERVER | Virtual Server Software Ver. 5.0 | | ... | ... | 2013/01/01 |
| 00000003 | VIRTUAL SERVER | Virtual Server Software Ver. 5.0 | | ... | ... | 2013/01/01 |
| 00000004 | VIRTUAL SERVER | Virtual Server Software Ver. 4.1 | | ... | ... | 2012/12/01 |
| 00000005 | VIRTUAL SERVER | Virtual Server Software Ver. 4.0 | | ... | ... | 2012/11/01 |
| 00000006 | STORAGE MANAGEMENT SERVER | Storage Management Software 7.1 | | ... ScanStorageSubSystem GetStorageArray AddVirtualVolume ... | 11:00:00 ScanStorageSubSystem 11:20:00 GetStorageArray 11:30:00 AddVirtualVolume ... | 2013/01/01 |
| 00000007 | STORAGE SYSTEM | Storage System XXX | | | | 2013/01/01 |
| 00000008 | STORAGE SYSTEM | Storage System YYY | | | | 2013/01/01 |
| 701 | 702 | 703 | | 704 | 705 | 706 |

Fig. 15B

OPERATION CONTENT EVALUATION SYSTEM AND STORAGE MEDIUM

BACKGROUND

This invention relates to a technology for automating operations and maintenance of a computer system.

For efficient operations or maintenance of a computer system including virtual machines, a network, and a storage system, demanded is automation of job execution in a data center. To automate job execution, technologies have been proposed that utilize operation contents (or operational processes or workflows) providing specifications of the operations or maintenance.

To select an operation content, there is a known technique that classifies user information such as profiles, information on the things to apply the operation content, and information on usage of the things and makes matching of the things with the users' tastes (for example, JP 2010-272121 A).

SUMMARY

There is a problem that operation contents created in different data centers differ in applicability depending on the environment of the computer system of the user, so that the applicability of an operation content cannot be known until the user actually runs the operation content under the user's environment.

A representative aspect of this invention is as follows. An operation content evaluation system for evaluating an operation content for controlling computer resources, the operation content evaluation system comprising: a content site including a content management server for distributing operation contents for controlling computer resources; and a user site including a content evaluation server for evaluating one of the operation contents and computer resources managed by the content evaluation server, the content evaluation server including a processor, storage resources, and an interface and being connected with the content management server via the interface, wherein the content management server holds catalogs associated one-to-one with the operation contents and each of the catalogs includes prerequisites for executing an operation content and evaluation elements for the operation content, wherein the content evaluation server holds configuration information collected from the computer resources managed by the content evaluation server in resource management information, and wherein the content evaluation server acquires the catalogs from the content management server, selects a catalog associated with the operation content to be evaluated from the catalogs, and evaluates the operation content by comparing the selected catalog with the resource management information.

This invention enables determination of whether an operation content is applicable to the computer resources of a user through evaluating the catalog of the operation content before actually running the operation content.

BRIEF DESCRIPTION OF THE DRAWINGS

FIG. 9 is a diagram illustrating an example of the content management table of this invention.

FIG. 10 illustrates an example of the catalogs of this invention.

FIG. 11 is a diagram illustrating an example of the evaluation elements of this invention.

FIG. 12 is a diagram illustrating an example of the evaluation elements of this invention.

FIG. 13 is a diagram illustrating an example of the evaluation elements of this invention.

FIG. 14 is a diagram illustrating an example of the resource management table of this invention.

FIG. 15A is the first half of the drawing illustrating an example of the resource management table of this invention.

FIG. 15B is the second half of the drawing illustrating an example of the resource management table of this invention.

DETAILED DESCRIPTION OF THE EMBODIMENTS

Hereinafter, an embodiment of this invention is described with reference to the accompanying drawings.

Figure 1:
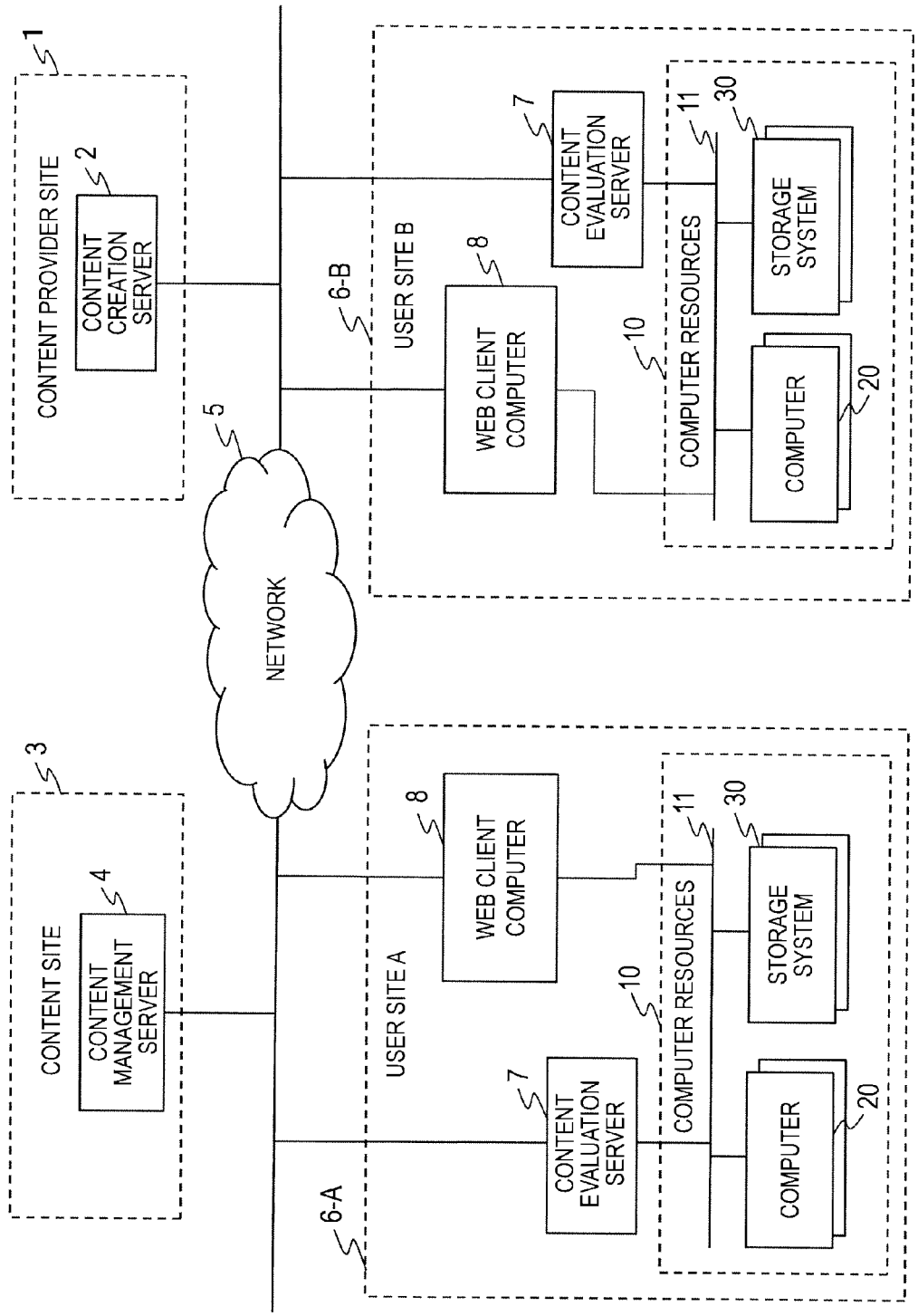
FIG. 1 is a block diagram illustrating an example of the computer system of this invention.

FIG. 1 is a block diagram illustrating an example of the computer system of this invention.

The user sites 6-A and 6-B, which independently operate and manage the computer system for the respective users, are connected with a content provider site 1 and a content site 3 via a network 5.

In each user site 6-A or 6-B, a web client computer 8 downloads an operation content and a catalog from the content site 3 and a content evaluation server 7 uses them. The content evaluation server 7 determines whether the operation content is applicable to the computer resources 10 in the local user site 6-A or 6-B with the downloaded catalog. As to an operation content usable with the computer resources 10 in the local user site 6-A or 6-B, the content evaluation server 7 can also evaluate the effects of application of the operation content through the evaluation of the catalog.

As will be described later, an operation content in this embodiment is software for a user (or administrator) to automate manual actions or a job including manual actions in operations or management of the computer resources 10 in a data center. A catalog in this embodiment is an aggregation of information including prerequisites to run an operation content and evaluation elements to evaluate the operation content. The association relations between operation contents and catalogs are managed in the content management server 4.

The content provider site 1 includes a content creation server 2 for creating operation contents and catalogs. With the content creation server 2, the administrator or an operator creates operation contents and catalogs. The operation contents and catalogs created in the content creation server 2 are sent to the content site 3.

The content site 3 includes a content management server 4 and stores the operation contents and catalogs created in the content provider site 1 to manage the association relations between the operation contents and the catalogs.

The user sites 6-A and 6-B each include a web client computer 8, a content management server 7, and computer resources 10. The user sites 6-A and 6-B have the same configuration and are generally denoted by the reference numeral 6. The content evaluation server 7 and the web client computer 8 are connected with the content site 3 via the network 5. The web client computer 8 and the content management server 7 are connected with the computer resources 10 via a network 11. The computer resources 10 include the network 11, computers 20, and storage systems 30.

In the user site 6, the web client computer 8 instructs the content evaluation server 7 to acquire a catalog or an operation content, to evaluate the catalog, and to execute the operation content. The content evaluation server 7 also has a function to manage the computer resources 10.

Figure 2:
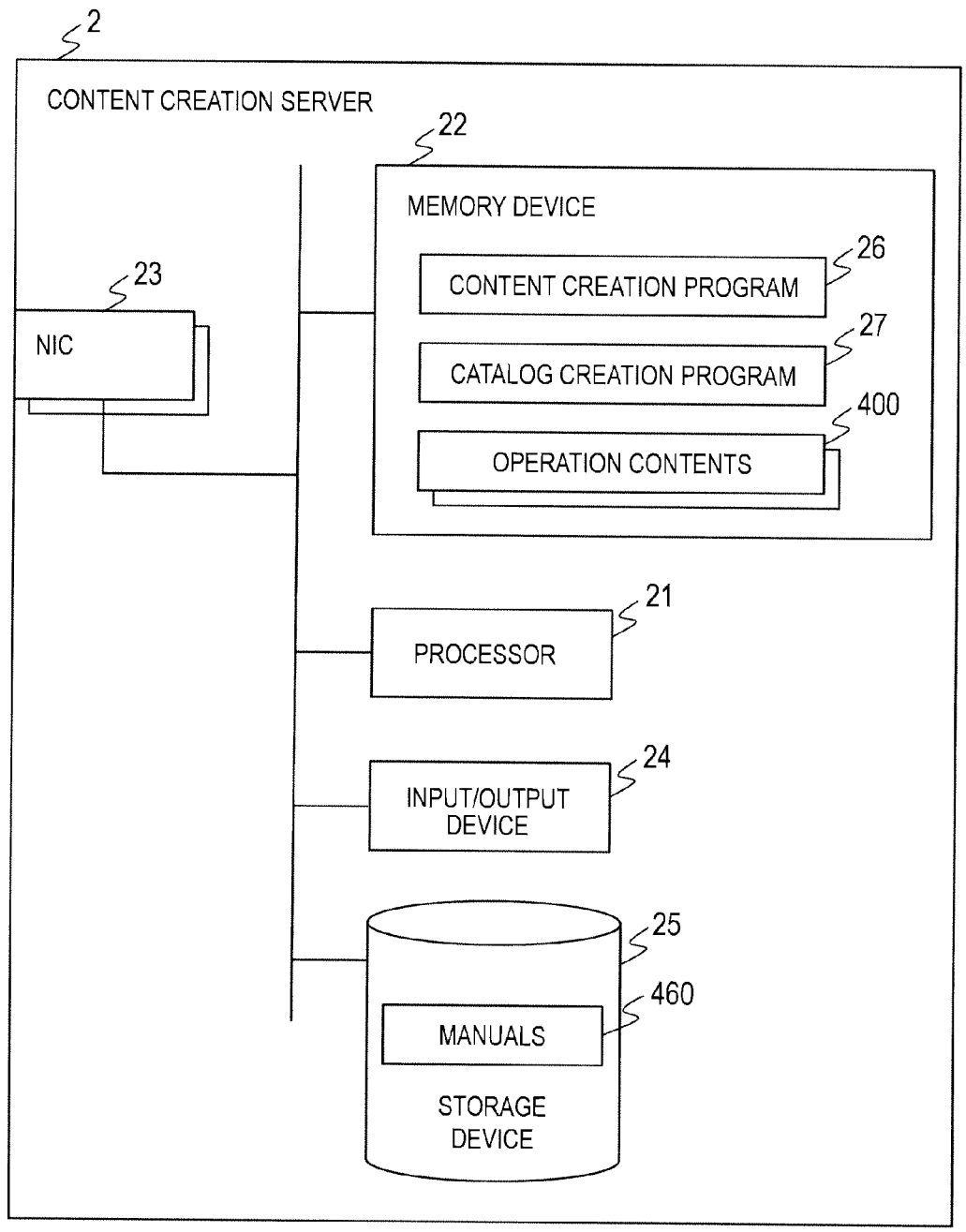
FIG. 2 is a block diagram illustrating an example of the configuration of the content creation server of this invention.

FIG. 2 is a block diagram illustrating an example of the configuration of the content creation server 2.

The content creation server 2 in the content provider site 1 is a computer including a processor 21, a memory device 22, a NIC (Network Interface Card) 23, an input/output device 24, and a storage device 25.

The memory device 22 stores a content creation program 26 for creating contents 400 and a catalog creation program 27 for creating catalogs 420 and registering them in the content management server 4. These programs are executed by the processor 21. The contents 400 created by the content creation program 26 are once stored in the memory device 22 and then registered in the content management server 4.

The storage device 25 stores manuals 460, which are referred to by the catalog creation program 27 in creating catalogs 420. Each manual 460 is information defining the configuration of the computer resources 10 to execute an operation content 400 and is created in advance.

The following description may include descriptions with subjects of programs, but such descriptions may be replaced by those having subjects of the processor 21 because each program is executed by the processor 21 to perform predetermined processing using the memory device 22 and a communication port (the NIC 23). The processing disclosed by the descriptions having the subjects of programs may be taken as the processing performed by a computer or an information processing apparatus, such as a management server. The program, for a part or the entirety thereof, may be implemented by dedicated hardware.

The programs may be installed in computers through a program distribution server or a computer-readable storage medium. In these cases, the program distribution server includes a processor and storage resources, which store a distribution program and the programs to be distributed. A CPU in the program distribution server executes the distribution program to distribute the programs to be distributed to other computers.

The information of programs for implementing the functions of the content creation server 2 can be stored in a storage device such as the storage device 25, a non-volatile semiconductor memory, a hard disk drive, or an SSD (Solid State Drive), or a computer-readable non-transitory data storage medium such as an IC card, an SD card, or a DVD.

The NIC 23 is connected with the network 5 to send and receive information. The input/output device 24 includes an input device such as a keyboard or a mouse and an output device such as a display device. The input/output device 24 may be a device other than these devices.

The memory device 22 and the storage device 25 may be inclusively treated as storage resources.

Figure 3:
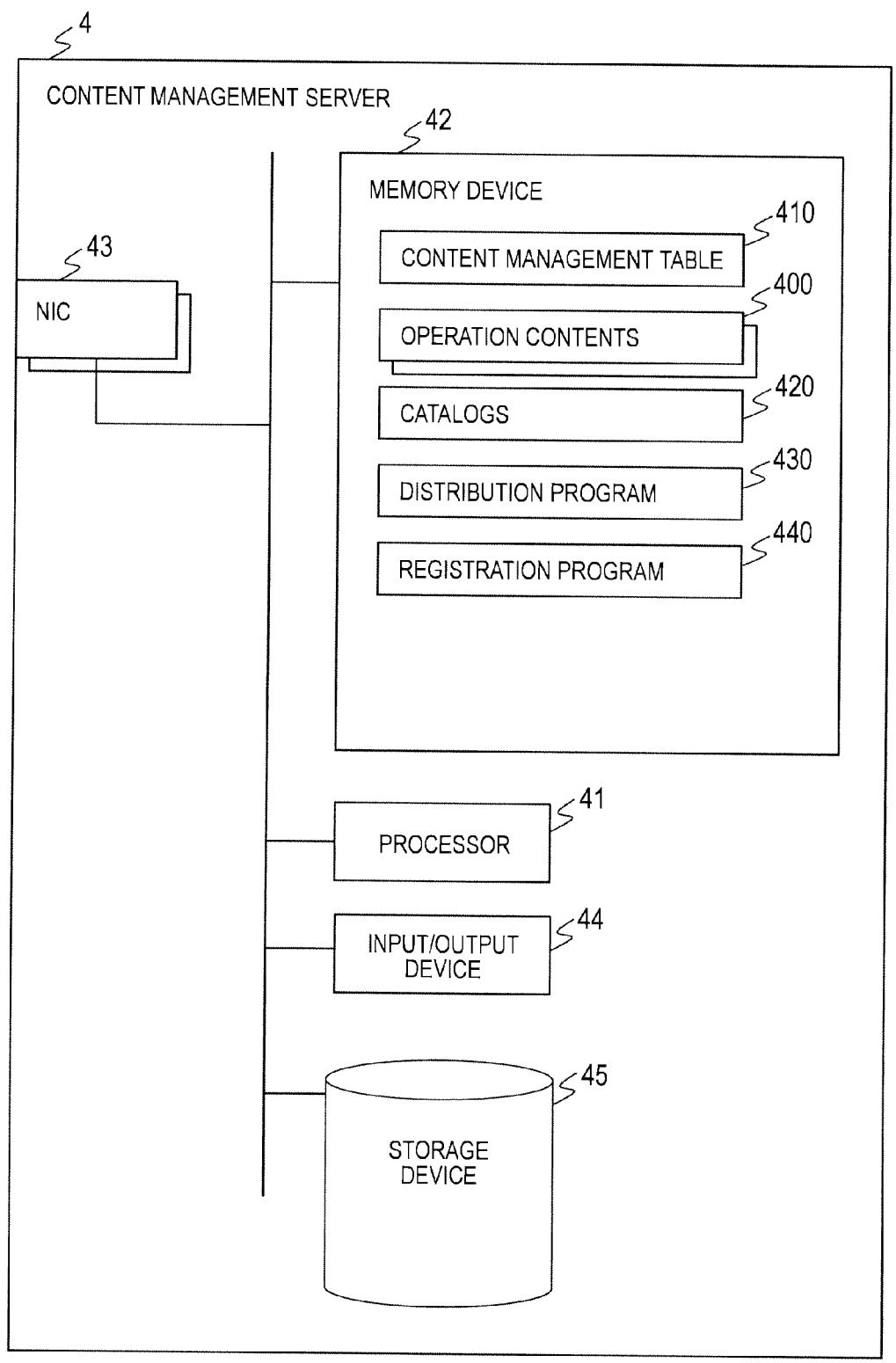
FIG. 3 is a block diagram illustrating an example of the configuration of the content management server of this invention.

FIG. 3 is a block diagram illustrating an example of the configuration of the content management server 4.

The content management server 4 in the content site 3 manages the operation contents 400 and the catalogs 420 created in the content provider site 1 in association with each another. The content management server 4 distributes an operation content 400 and a catalog 420 in response to a request from the user site 6.

The content management server 4 is a computer including a processor 41, a memory device 42, a NIC 43, an input/output device 44, and a storage device 45.

The memory device 42 stores a registration program 440 for registering the operation contents 400 and the catalogs 420, a distribution program 430 for providing the operation contents 400 and the catalogs 420 to the user site 6, and a content management table 410 for managing association relations between the operation contents 400 and the catalogs 420, and the registered operation contents 400 and catalogs 420.

The operation contents 400, the catalogs 420, and the content management table 410 may be stored in the storage device 45 and loaded to the memory device 42 as necessary.

The information of programs for implementing the functions of the content management server 4 can be stored in a storage device such as the storage device 45, a non-volatile semiconductor memory, a hard disk drive, or an SSD (Solid State Drive), or a computer-readable non-transitory data storage medium such as an IC card, an SD card, or a DVD.

In the following description, the information used in this invention is described using the terms of table, list, DB, and queue; however, it may be configured in a data structure other than the table, list, DB, and queue. In order to express independency from the data structure, the table, list, DB, queue, and the like may be merely referred to as information.

In describing the information, terms such as identification information, identifier, name, and ID are used; these are replaceable with one another.

The NIC 43 is connected with the network 5 to send and receive information. The input/output device 44 includes an input device such as a keyboard or a mouse and an output device such as a display device. The input/output device 44 may be a device other than these devices.

The memory device 42 and the storage device 45 may be inclusively treated as storage resources.

Figure 4:
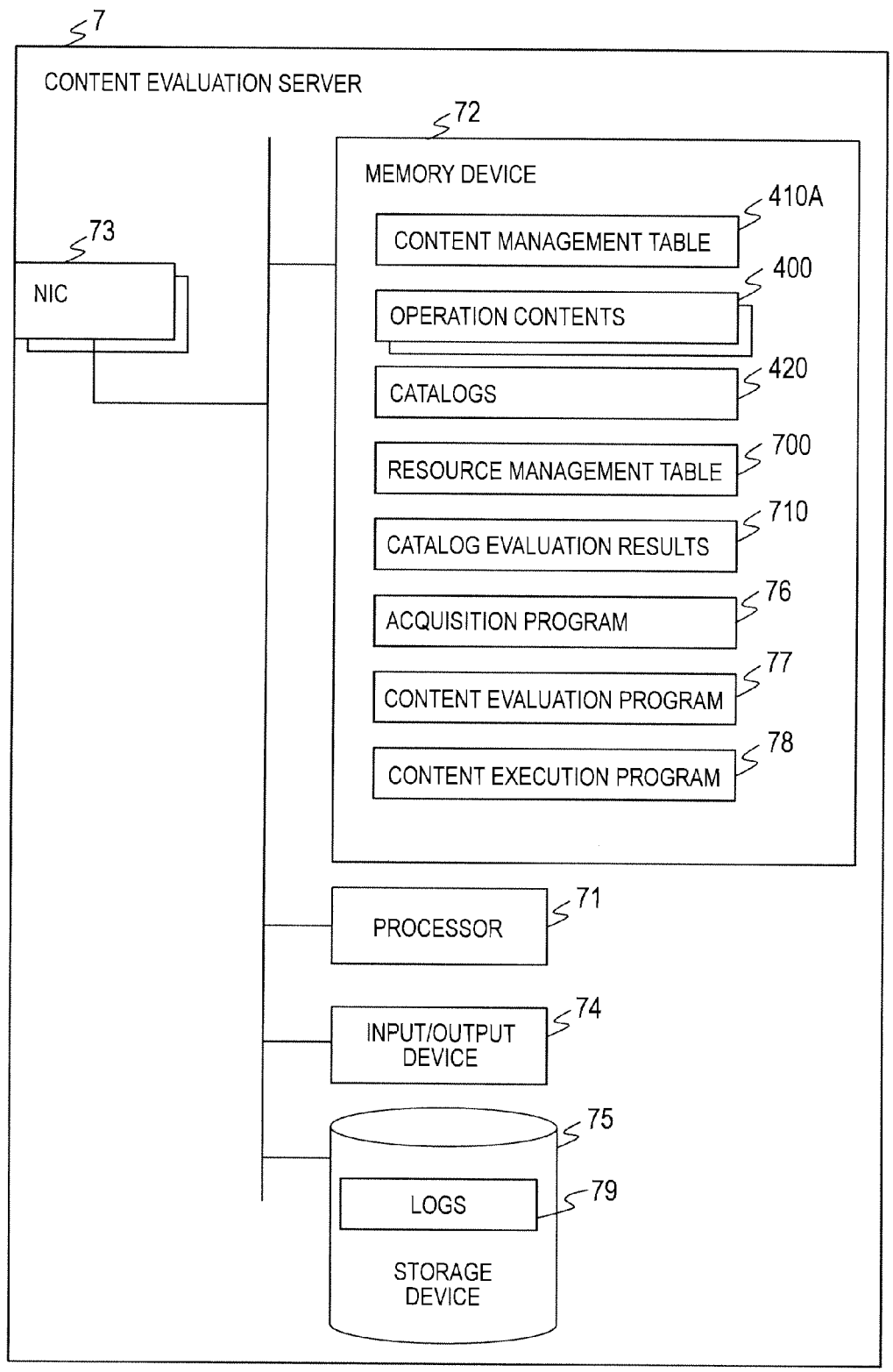
FIG. 4 is a block diagram illustrating an example of the configuration of the content evaluation server of this invention.

FIG. 4 is a block diagram illustrating an example of the configuration of the content evaluation server 7. In both of the user sites 6-A and 6-B, their respective content evaluation servers 7 have the same configuration. In response to instructions from the web client computer 8, the content evaluation server 7 acquires an operation content 400 and a catalog 420 from the content management server 4, evaluates the catalog 420, executes the operation content 400, controls the computer resources 10, and operates the computer resources 10.

The content evaluation server 7 is a computer including a processor 71, a memory device 72, a NIC 73, an input/output device 74, and a storage device 75.

The memory device 72 stores an acquisition program 76 for acquiring operation contents 400 and catalogs 420, a content evaluation program 77 for evaluating the operation contents 400 and catalogs 420, and a content execution program 78 for executing the operation contents 400, a content management table 410A for managing association relations between the operation contents 400 and the catalogs 420, the acquired operation contents 400 and catalogs 420, catalog evaluation results 710 which are the results of evaluation of the catalogs 420, and a resource management table 700 for managing the configuration of the computer resources 10.

The operation contents 400, the catalogs 420, the content management table 410A, the resource management table 700, and the catalog evaluation results 710 may be stored in the storage device 75 and loaded to the memory device 72 as necessary.

The operation contents 400 and the catalogs 420 in the content evaluation server 7 are acquired from the content management server 4. The content management table 410A in the content evaluation server 7 is created by the content evaluation server 7 so as to hold the association relations between the operation contents 400 and the catalogs 420. The content management table 410A has the same configuration as the content management table 410A in the content management server 4.

The information of programs for implementing the functions of the content evaluation server 7 can be stored in a storage device such as the storage device 75, a non-volatile semiconductor memory, a hard disk drive, or an SSD (Solid State Drive), or a computer-readable non-transitory data storage medium such as an IC card, an SD card, or a DVD.

In replacement of the input/output device 74, a serial interface or an Ethernet interface regarded as the input/output device may be connected with a display computer including a display or a keyboard or a pointer device. Inputting and displaying of the input/output device may be replaced by receiving input information from the display computer and sending information to the display computer through the interface for the display computer to receive inputs and display.

Hereinafter, the aggregation of one or more computers for managing the computer resources 10 (an information processing system) and showing information to be displayed in this invention may be referred to as management system. In the case where the content evaluation server 7 functioning as a management computer shows the information to be displayed, the content evaluation server 7 is the management system. The combination of the management computer and the display computer is also the management system. For higher speed or higher reliability in performing management jobs, multiple computers may perform the processing equivalent to that of the management computer; in this case, the multiple computers (including a display computer if it handles showing information) are the management system.

The storage device 75 stores logs 79 of actions performed for maintenance and operations of the computer resources 10 in response to instructions from the web client computer 8. These logs 79 can be used to determine the time taken for a job manually performed by the administrator in the user site 6.

The NIC 73 is connected with the network 5 to send and receive information. The input/output device 74 includes an input device such as a keyboard or a mouse and an output device such as a display device. The input/output device 74 may be a device other than these devices.

The information of programs for implementing the functions of some content can be stored in a storage device such as the storage device 75, a non-volatile semiconductor memory, a hard disk drive, or an SSD (Solid State Drive), or a computer-readable non-transitory data storage medium such as an IC card, an SD card, or a DVD.

The memory device 72 and the storage device 75 may be inclusively treated as storage resources.

Figure 5A:
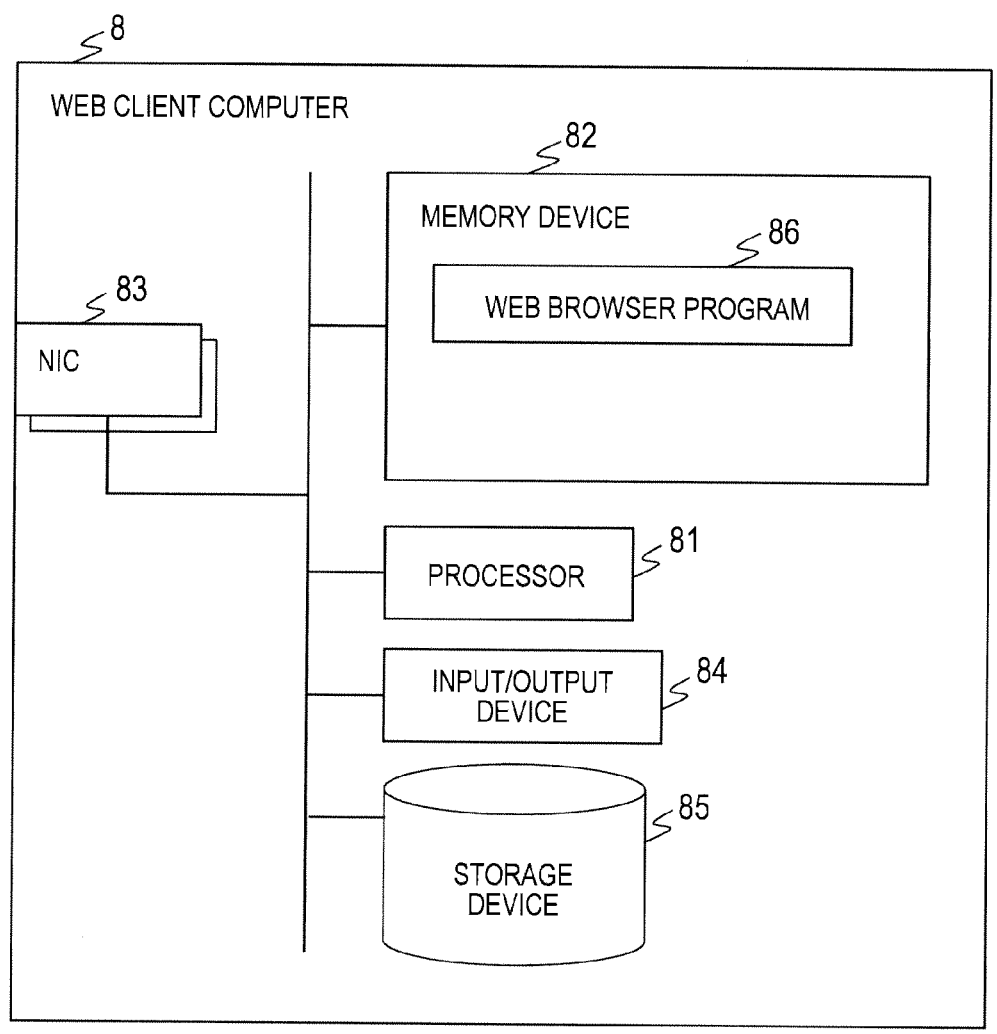
FIG. 5A is a block diagram illustrating an example of the configuration of the web client computer of this invention.

FIG. 5A is a block diagram illustrating an example of the configuration of the web client computer 8. The web client computer 8 instructs the content evaluation server 7 to acquire an operation content 400 and a catalog 420 from the content management server 4, to evaluate the operation content 400 and the catalog 420, to execute the operation content 400, and to control or operate the computer resources 10.

The web client computer 8 is a computer including a processor 81, a memory device 82, a NIC 83, an input/output device 84, and a storage device 85. The memory device 82 stores a web browser program 86, which is executed by the processor 81. The storage device 85 functions as a storage medium for holding the web browser program 86.

The NIC 83 is connected with the networks 5 and 11 to send and receive information. The input/output device 84 includes an input device such as a keyboard or a mouse and an output device such as a display device. The input/output device 74 may be a device other than these devices.

Figure 5B:
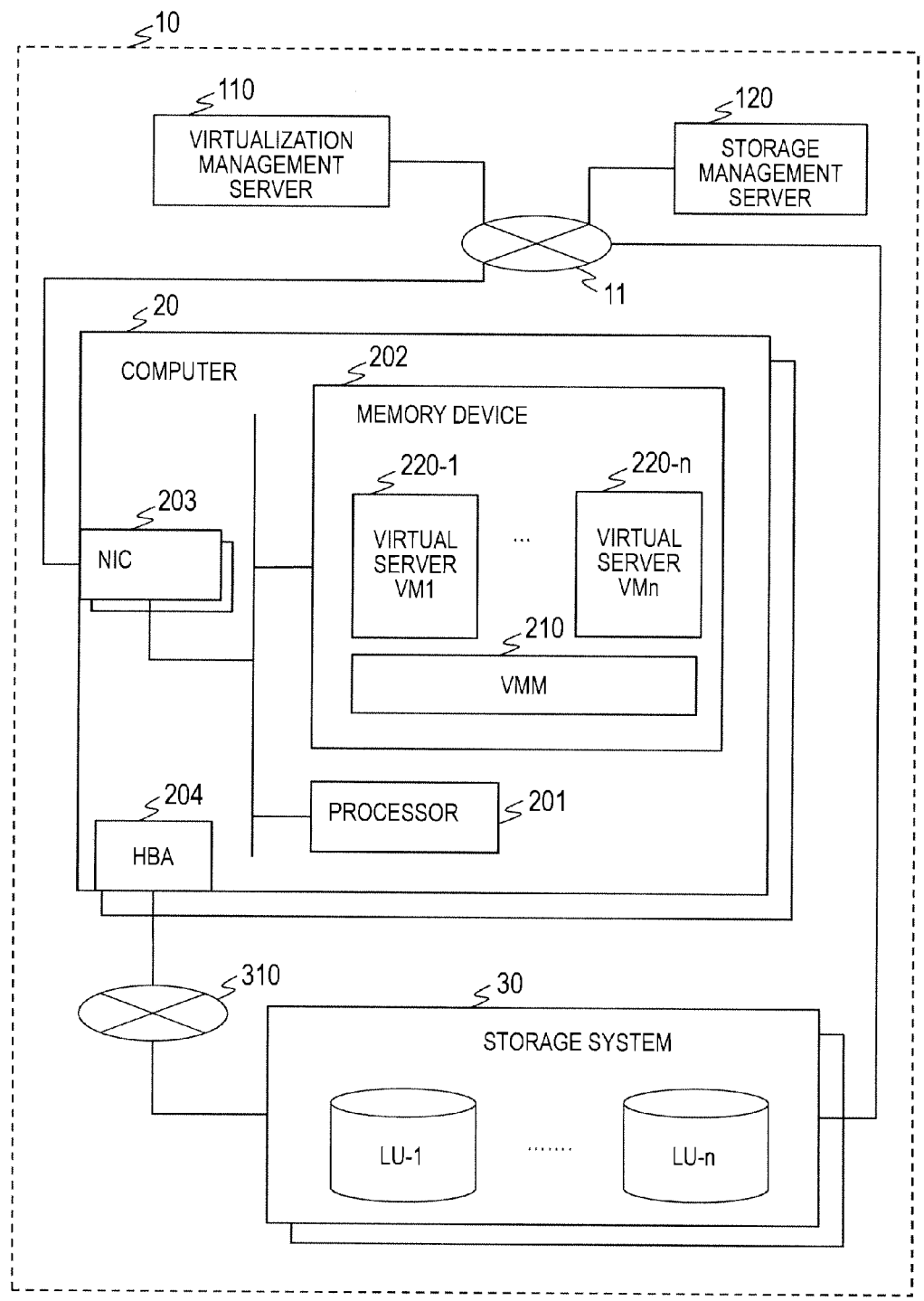
FIG. 5B is a block diagram illustrating an example of the computer resources of this invention.

FIG. 5B is a block diagram illustrating an example of the computer resources 10.

The computer resources 10 include one or more computers 20, one or more storage systems 30, a virtualization management server 110 for managing virtual servers 220-1 to 220-*n* and a VMM (Virtual Machine Monitor) 210 run on each of the computers 20, a storage management server 120 for managing the storage systems 30, a network 11 for connecting the servers and the apparatuses, and a SAN (Storage Area Network) 310 for connecting the computers 20 and the storage systems 30.

The storage systems 30 include one or more LUs (Logical Units) LU-1 to LU-n. The storage management server 120 manages the LUs (or storage areas) in the storage systems 30 and manages the LUs (or storage areas) to be allocated to the computers 20. The storage management server 120 also manages the LUs in the storage systems 30.

Each computer 20 includes a processor 201, a memory device 202, a NIC 203, and an HBA (Host Bus Adapter) 204. The memory device 202 stores the VMM 210 and the virtual servers 220-1 to 220-*n*, which are executed by the processor 21. The VMM 210 may be configured with a hypervisor. The virtual servers are generally denoted by the reference numeral 220.

The HBA 204 of each computer 20 is connected with the storage systems 30 via the SAN. The NIC 203 is connected with the network 11.

The virtualization management server 110 manages creation, migration, and deletion of a virtual server 220 running on the computers 20. The virtualization management server 110 and the storage management server 120 are computers each including a processor, a memory device, and a NIC like the content creation server 2 illustrated in FIG. 2, the details of these servers are omitted in the drawing.

Figure 6:
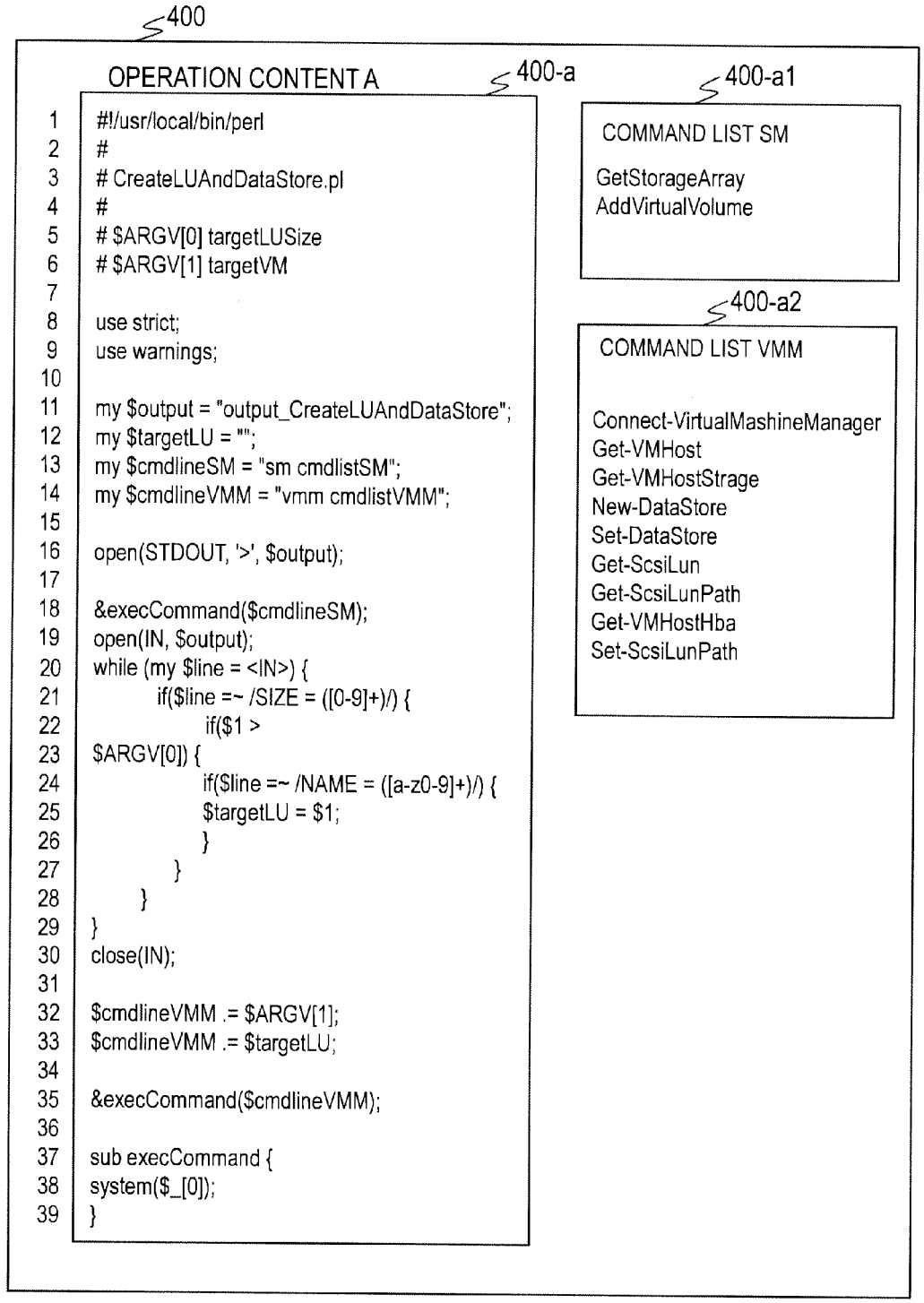
FIG. 6 illustrates an example of an operation content A of this invention.
Figure 7:
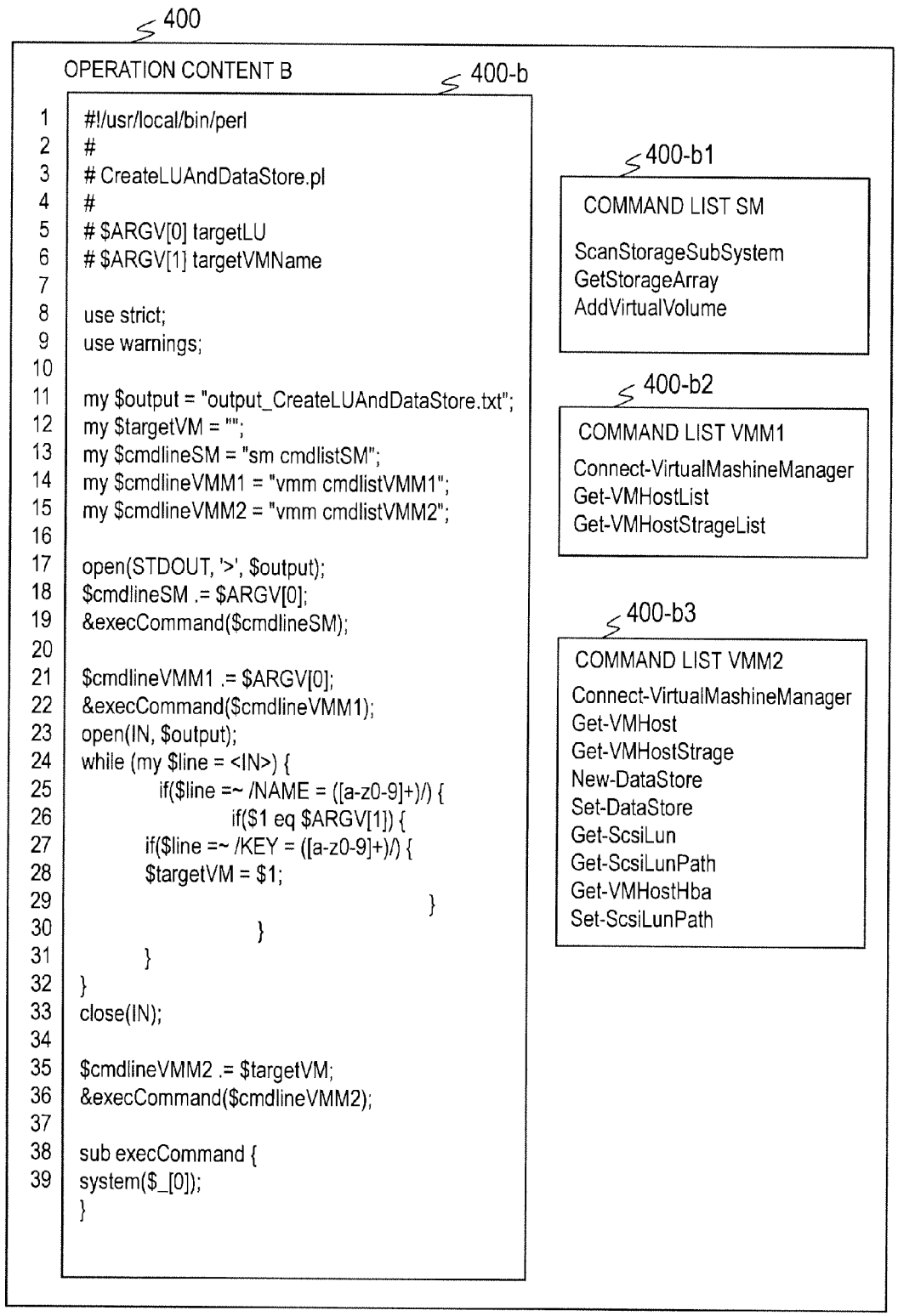
FIG. 7 illustrates an example of an operation content B of this invention.
Figure 8:
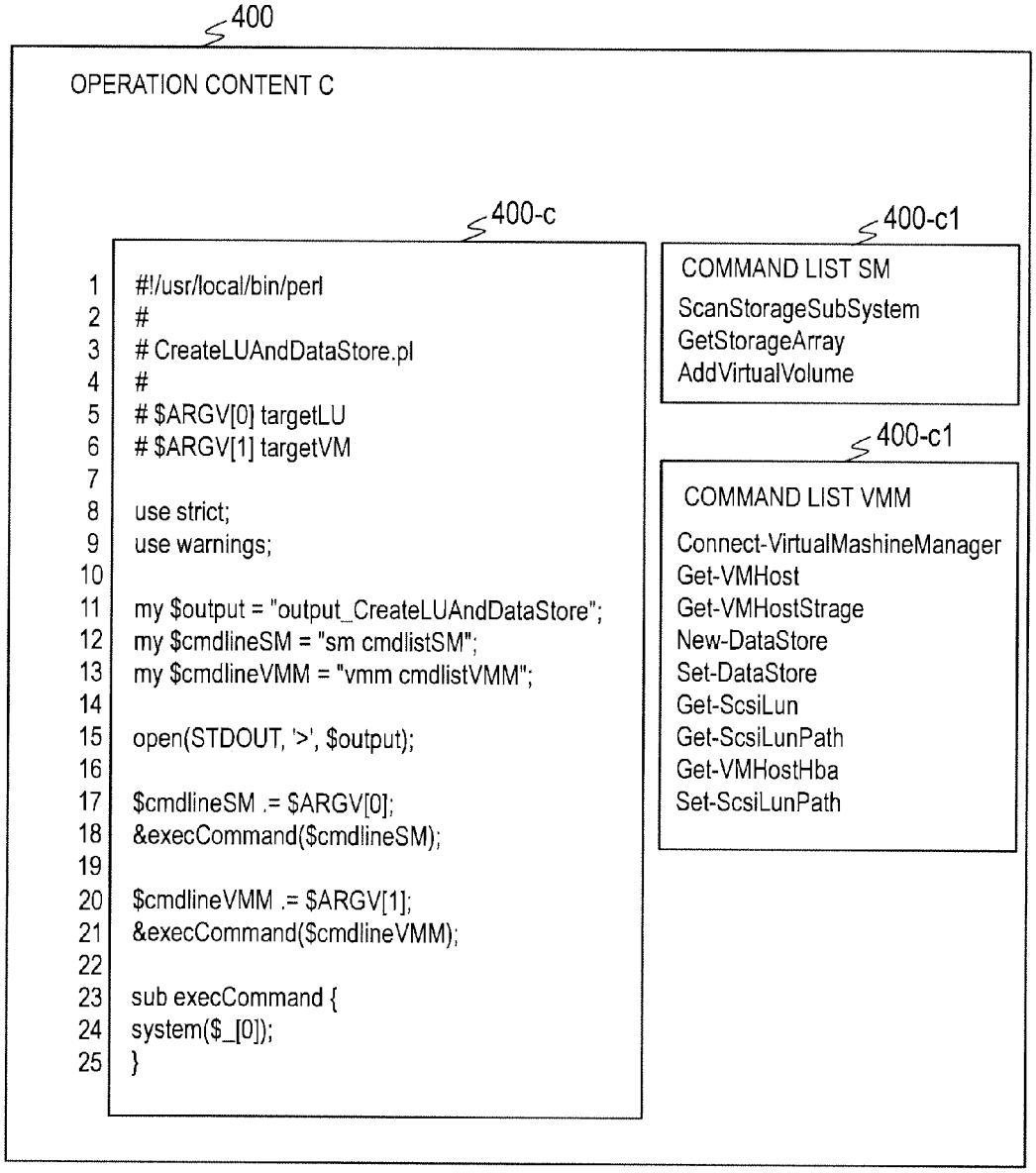
FIG. 8 illustrates an example of an operation content C of this invention.

FIGS. 6 to 8 are diagrams illustrating examples of operation contents 400. FIG. 6 illustrates an example of an operation content A; FIG. 7 illustrates an example of an operation content B; and FIG. 8 illustrates an example of an operation content C.

Each of the operation contents 400 shown in FIGS. 6 to 8 includes an operation content described in Perl and command lists for individual types of computer resources 10 to be controlled (or operated).

The operation content A (400) in FIG. 6 is an operation content 400 for providing a virtual server 220 allocated a desired size of LU and includes a script 400-a and command lists 400-a1 and 400-a2.

The script 400-a is information of a specification of a procedure for controlling or operating the computer resources 10. The command list 400-a1 is information listing commands for the storage management server 120 in order of execution. The command list 400-a2 is information listing commands for the virtualization management server 110 in order of execution.

In the script 400-a, "# $ARGV[0] targetLUSize" on the line 5 is to receive a size required for the LU (for example, 40 GB) and "# $ARGV[1] targetVM" on the line 6 is to receive the name (or the identifier) of the virtual server 220 to allocate the LU.

Further in the script 400-a, "output_CreateLUAndDataStore" on the line 11 indicates the place to store the results of execution of the command lists 400-a1 and 400-a2 (intermediate files).

The lines 13 and 14 of the script 400-a specify that "$cmdlineSM" is the command list 400-a1 and "$cmdlineVMM" is the command list 400-a2.

The line 16 of the script 400-a is to open the intermediate file ($output); the line 18 is to execute the command list 400-a1 ($cmdlineSM); the line 19 is to open the intermediate file; the lines 20 to 30 is to search for an LU having a required size (for example, 40 GB) and assigns the name or identifier of the LU to the variable $targetLU.

Next, the lines subsequent to the line 32 of the script 400-a are to control the VMM 21; particularly, the line 35 is to execute the command list 400-a2 so as to allocate the detected LU to the virtual server 220 specified by the foregoing line 6 and run the virtual server 220.

As understood from the above, the operation content A in FIG. 6 can automate the actions of receiving the size of the LU and the name of the virtual server 220, allocating an LU having the specified size to the virtual server 220, and then providing this virtual server 220.

This embodiment has provided an example of controlling (operating) the computer resources 10 by means of a Perl script but is not limited to this. An operation content 400 is to be information including a procedure for controlling or operating the computer resources 10 and instructions to the objects to be controlled (operated).

FIG. 7 is a diagram illustrating an example of a content. The operation content B (400) in FIG. 7 automates the actions of inputting the name of a virtual server 220 (targetVMName), acquiring a list of virtual servers 220, outputting the list to the input/output device, selecting a desired virtual server from the output list of virtual servers, allocating an LU to this virtual server, and providing the virtual server to a user. The operation content B shown in FIG. 7 specifies to make inquiries to two VMMs (VMM1 and VMM2). The rest of the content is the same as FIG. 6. It should be noted that the input/output device to implement this inputting and outputting is the input/output device of the content evaluation server 7 that executes this operation content B or the web client computer 8 connected with the content evaluation server 7.

FIG. 8 is a diagram illustrating an example of a content. The operation content C (400) in FIG. 8 automates the actions of receiving the names of a virtual server 220 and an LU, allocating the LU having the received name to the virtual server 220 having the received name, and providing this virtual server 220 to a user. The rest of the content is the same as FIG. 6.

FIG. 9 is a diagram illustrating an example of the content management table 410 (410A). The content management table 410 in the content management server 4 or the content management table 410A in the content evaluation server 7 manages association relations between operation contents 400 and catalogs 420. Since the content management table 410A held in the content evaluation server 7 has the same structure as the content management table 410 in the content management server 4, the following describes the content management table 410 in the content management server 4.

The content management table 410 includes a content ID 4101 for storing the identifier of an operation content 400, a catalog ID 4102 for storing the identifier of a catalog 420, and a description of content 4103 for storing the general description of the operation content 400 in each record (or entry). The content ID 4101 and the catalog ID 4102 should be values unique to the content provider site 1 and they may be assigned by the content creation server 2. The combination of the content ID 4101 and the catalog ID 4102 provides an association relation between the operation content 400 and the catalog 420.

The description of content 4103 includes description of the control or actions performed by the operation content 400.

FIG. 10 illustrates an example of the catalogs 420. The catalogs 420 created by the content creation server 2 and stored in the content management server 4 include prerequisites to execute individual contents 400 and evaluation elements to evaluate individual operation contents 400 (FIGS. 11 to 13).

The catalogs 420 include a catalog ID 4201 for storing the identifier of a catalog, a content ID 4202 for storing the identifier of an operation content 400, a description of content 4203 for storing the general description of the operation content 400, and evaluation elements 4204 for storing the identifier (or the name) of evaluation elements for the operation content 400 in each record (or entry). The evaluation elements 4202 may be a pointer indicating the storage location of the evaluation elements for the content ID 4202.

FIG. 11 is a diagram illustrating an example of the evaluation elements (Table A). The evaluation elements 4204A show the details of the evaluation elements (Table A) in FIG. 10, which is information prescribing conditions and items on which the operation content 400 identified by the content ID 4202 is evaluated.

The evaluation elements 4204A include an identifier 42010 indicated by evaluation elements 4204 of the catalog 420, resource information 42011 indicating the types of computer resources 10, evaluation formulae 42012 of prerequisites on the computer resources 10 required to execute the operation content 400 for which the evaluation elements 4204A are provided, prerequisites 1 to 3 (42013 to 42015) for storing detailed conditions, evaluation points 42016 for determining the effects of the operation content 400, command lists 42017 for storing commands available for the resource information, and time information 42018 for storing estimated execution time lengths of the operation content 400 in a record (or entry).

To the resource information 42011, records are provided about the types of the computer resources 10 required to execute the operation content 400 (Contents_ProviderA_CreateLUAndDataStore_0100) identified by the content ID 4202 in FIG. 10. According to the example of FIG. 11, four records of the virtualization management server 110, a virtual server 220, a storage management server 120, and a storage system 30 are the requisite resources to execute the operation content 400.

A prerequisite evaluation formula 42012 is a formula defining the relationship of the prerequisite 1 (42013) to the prerequisite 3 (43015). The symbol "*" in the diagram represents AND and the symbol "+" represents OR. For example, the prerequisite evaluation formula "1*2" means that the both of the prerequisite 1 (42013) and the prerequisite 2 (42014) need to be satisfied. The prerequisite evaluation formula "1+2" means that either the prerequisite 1 (42013) or the prerequisite 2 (42014) needs to be satisfied.

Each of the prerequisite 1 (42013) to the prerequisite 3 (42015) stores information for specifying a required computer resource 10, such as the model name, the software name, the version, or the revision of the computer resource 10.

The evaluation points 42016 are set at "1" for the records of resource information 42011 that will get some advantageous effect if the operation content 400 associated with the evaluation elements 4204A is executed. The example of FIG. 11 indicates that the execution of the operation content 400 is effective on the storage system. The effect of the execution of an operation content 400 means reduction in cost or labor required for the job (or actions) for the operations or maintenance.

The command lists 42017 contain commands available in the command lists in the operation content 400 for the individual records of the resource information 42011.

The time information 42018 indicates the time taken to execute each command list 42017 in the operation content 400 and is used to estimate the effect compared to the time required for manual operations or maintenance. For the shown command list 42017 for the virtualization management server, the time taken from the start to the completion of execution of the sequential commands "Connect-VirtualMachineManager" to "Set-ScsiLunPath" is set to the time information 42018. Since the execution time of the command list 42017 varies depending on the configuration of the computer resources 10 or the loads to the computer resources 10, the creator of the content may set a reference execution time to the time information 42018.

FIG. 12 is a diagram illustrating an example of the evaluation elements (Table B). The evaluation elements have the same configuration as FIG. 11. The evaluation elements 4204B show the details of the evaluation elements (Table B) in FIG. 10. In view of the evaluation points 42016, the evaluation elements (Table B) in FIG. 12 indicate that the operation content 400 is effective on operations or maintenance of the virtual servers.

FIG. 13 is a diagram illustrating an example of the evaluation elements (Table C). The evaluation elements have the same configuration as FIG. 11. The evaluation elements 4204C show the details of the evaluation elements (Table C) in FIG. 10. In view of the evaluation points 42016, the evaluation elements (Table C) in FIG. 12 indicate that the operation content 400 is effective on operations or maintenance of the storage system.

FIG. 14 is a diagram illustrating an example of the resource management table (user site A) 700. The content evaluation server 7 in the user site 6 functions as a management server for the computer resources 10. The resource management table 700 is configuration information on the computer resources 10 managed by the content evaluation server 7. The content evaluation server 7 collects configuration information on the computer resources 10 in the user site 6 at a predetermined cycle and updates the resource management table 700.

The resource management table 700 includes a resource ID 701 for storing the identifier of a resource, a resource type 702 for storing the type of the resource, resource information 703 for storing information such as the model name and version of the resource, a command history 704 for storing the history of commands used on the resource information, log information 705 for storing the history of actions performed on the resource, and an update time and date 706 for storing the time and date of update in each record (or entry).

The resource ID 701 stores the identifier of a resource unique to the user site 6. The resource information 702 stores the type of the resource, like the resource information 42011 in the evaluation elements 4204A to 4204C linked with the catalogs 420.

The resource information 703 stores information such as the model name, the software name, the version, and the revision of the resource, like the prerequisites 1 to 3 in the evaluation elements 4204A to 4204C linked with the catalogs 420.

The command history 704 stores commands used on the resource. The commands can be acquired from a log 79 stored in the storage device 75 in the content evaluation server 7. Alternatively, the commands may be accumulated in the command history 704 when individual commands on the computer resource 10 are received from the web client computer 8.

The log information 705 stores a log 79 stored in the storage device 75 in the content evaluation server 7 or the location of storage thereof.

As understood from the above, the content evaluation server 7 manages the configuration or the history of use of the computer resources 10 by the resource management table 700.

FIG. 15A is the first half of the drawing illustrating an example of the resource management table (user site B) 700. FIG. 15B is the second half of the drawing illustrating an example of the resource management table (user site B) 700. The configuration of this resource management table 700 is the same as FIG. 14.

The resource management table 700 in the user site B shown in FIGS. 15A and 15B is different from the resource management table 700 in the user site A shown in FIG. 14 in the configuration of the computer resources that the resource information 703 includes a plurality of versions of the virtual servers 220 and a plurality of types of storage systems 30.

The command history 704 is a history of actions performed in the user site 6 and can suggest the content creator to create a new operation content 400. For this reason, the content evaluation server 7 may allow access to the resource management table 700 in response to a request for access from the content creation server 2.

Figure 16:
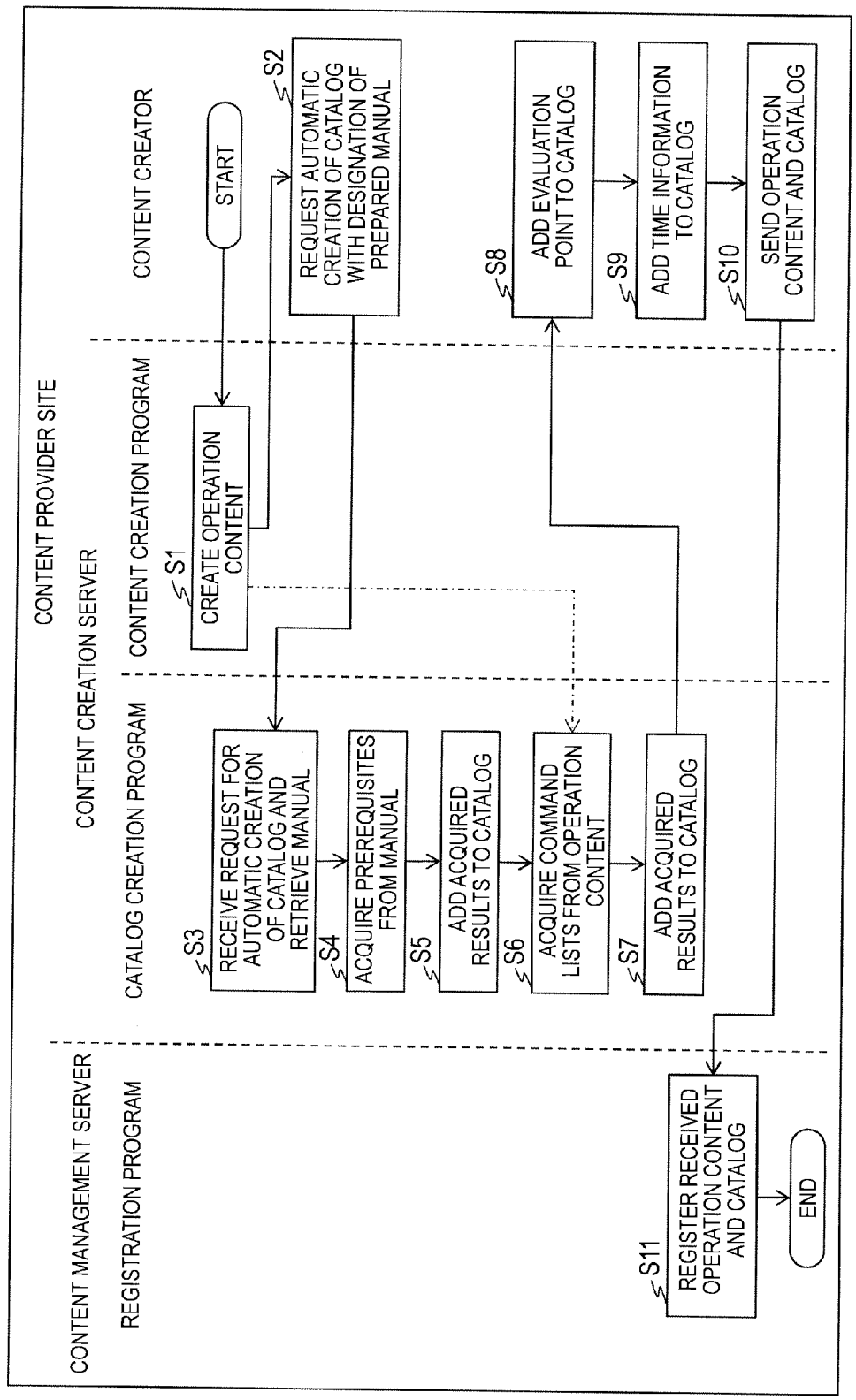
FIG. 16 is a flowchart illustrating an example of processing performed in the computer system to create a content and a catalog and register them of this invention.

FIG. 16 is a flowchart illustrating an example of processing performed in the computer system to create a content and a catalog and register them. This processing is started by the content creator who uses the content creation server 2.

In the content provider site 1, the content creator starts the content creation program 26 with the input/output device 24 of the content creation server 2 to create an operation content 400 in which a script 400-a and a command list 400-a1 are combined as illustrated in FIGS. 6 to 8 (S1). The content creation program 26 stores the created operation content 400 in the memory device 22 of the content creation server 2.

Next, the content creator requests the catalog creation server 2 to create a catalog 420 to be associated with the operation content 400 while designating a prepared manual 460 (S2). The storage device 25 of the content creation server 2 holds manuals 460 including specifications of prerequisites for individual operation contents 400 in advance.

The manuals 460 are specifications of prerequisites on environments of software and hardware for executing operation contents 400 and created separately for individual operation contents 400. Each manual 460 includes prerequisites on the type of resource (resource information), the version of the OS, the version of the VMM, the model name of the storage system 30, and the like.

Upon receipt of a request for automatic creation of a catalog 420, the content creation server 2 starts the catalog creation program 27 and retrieves the designated manual 460 (S3).

The catalog creation program 27 acquires all prerequisites from the retrieved manual 460 (S4).

The catalog creation program 27 retrieves the catalogs 420 from the content management server 4 and adds a new record to the catalogs 420 with a catalog ID 4201 and a content ID 4202 newly determined. The catalog creation program 27 creates new evaluation elements 4204A associated with the catalogs 420 and adds records corresponding to the types of resources (resource information 42011) acquired from the manual 460. The catalog creation program 27 further adds prerequisites to the prerequisites 1 to 3 for each record of the resource information 42011 in the evaluation elements 4204A (S5). The following description describes the processing on the evaluation elements 4204A shown in FIG. 11 by way of example, but the same applies to the other evaluation elements 4204B and 4204C.

The catalog creation program 27 retrieves the created operation content 400 and acquires command lists from it (S6). The catalog creation program 27 adds the acquired command lists to the command lists 42017 of the evaluation elements 4204A (S7).

The catalog creation program 27 receives an evaluation point for the newly added catalog 420 with the input/output device 24. The catalog creation program 27 adds the received evaluation point 42016 to the evaluation elements 4204A (S8).

Next, the catalog creation program 27 receives time information for the newly added catalog 420 with the input/output device 24. The catalog creation program 27 adds the received time information 42018 to the evaluation elements 4204A (S9). The content creator operates the input/output device 24 to request the content management server 4 for registration while sending the created operation content 400 and catalog 420 to the content management server 4 (S10).

Upon receipt of the request for registration, the content management server 4 starts the registration program 440 and registers the received new operation content 400 and catalog 420 (S11).

Through the foregoing processing, an operation content 400 newly created in the content provider site 1 and the catalogs 420 including a new record are registered in the content management server 4.

Figure 17:
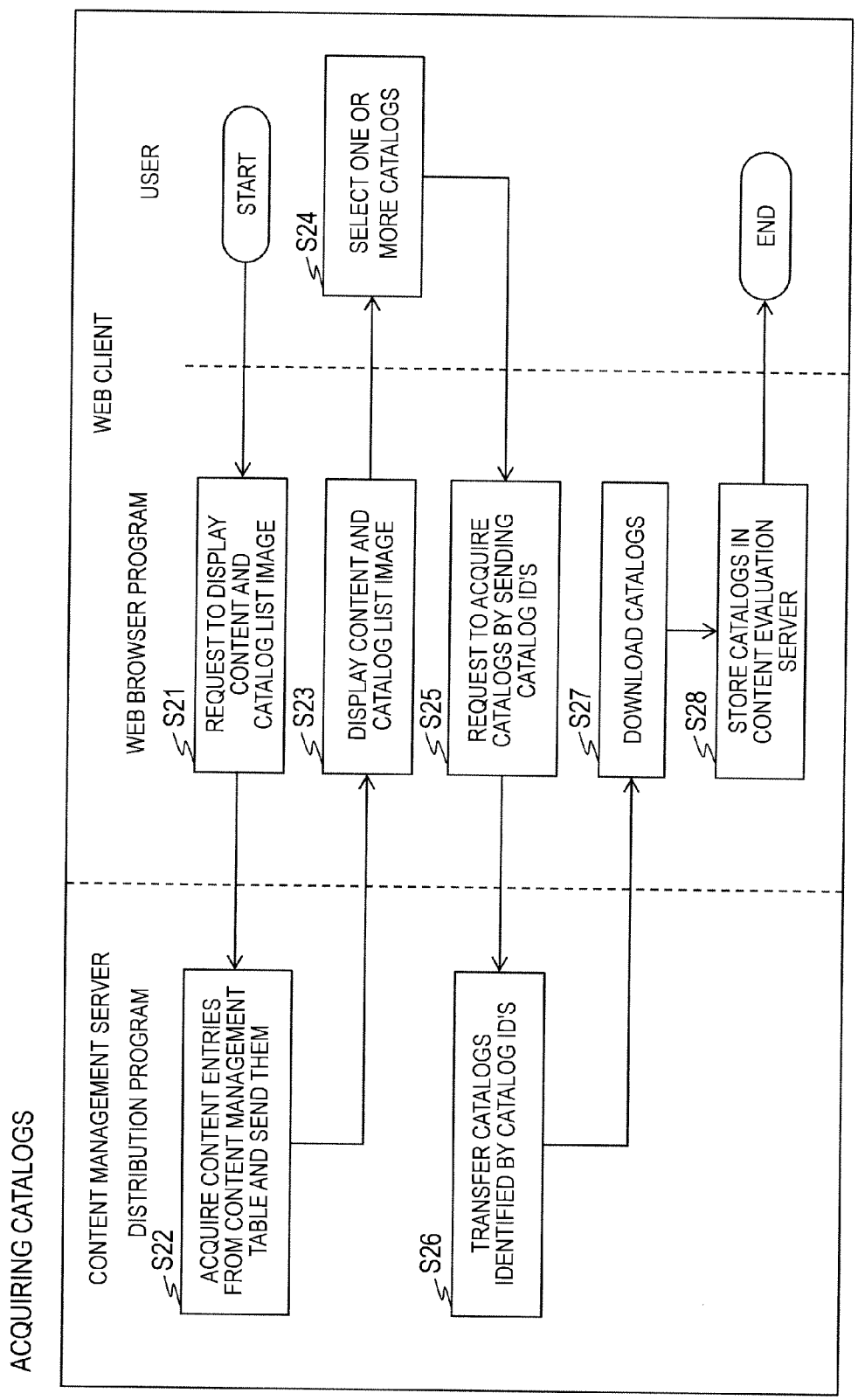
FIG. 17 is a flowchart illustrating an example of the processing performed in the computer system to acquire catalogs of this invention.

FIG. 17 is a flowchart illustrating an example of the processing performed in the computer system to acquire catalogs.

The flowchart illustrates an example that the user of the web client computer 8 acquires catalogs 420 from the content management server 4 in the content site 3.

The user of the web client computer 8 starts the web browser program 86 and accesses the content management server 4. Based on the user's instruction, the web browser program 86 sends a request to display a content and catalog list image to the content management server 4 to see the list of contents 400 and catalogs 420 (S21).

Upon receipt of the request to display a content and catalog list image, the content management server 4 acquires a predetermined number of records (for example, 10 records) and information such as the download count from the content management table 410 and sends them to the web client computer 8 (S22).

The web client computer 8 displays a content and catalog list image including the received records of the content management table 410 and download counts on the input/output device 84 (S23).

Figure 27:
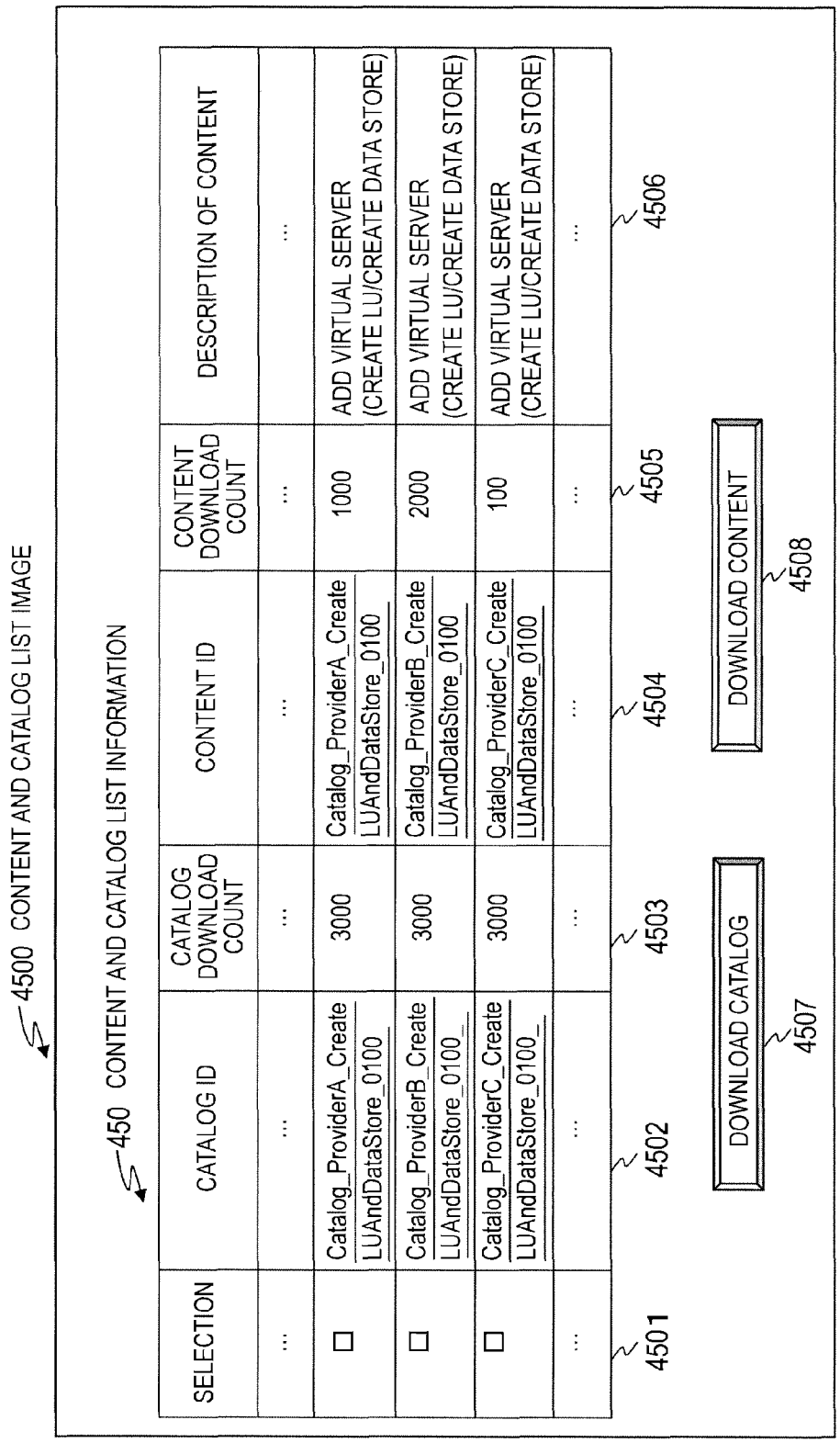
FIG. 27 is a screen image showing an example of the content and catalog list image of this invention.

FIG. 27 is a screen image showing an example of the content and catalog list image 4500. The content and catalog list image 4500 is an image that the web browser program 86 in the web client computer 8 shows on the input/output device 84.

The content and catalog list image 4500 includes a selection checkbox 4801, a catalog ID 4502, a catalog download count 4503, a content ID 4504, a content download count 4505, and a description of content 4506 in each entry. On the lower part of the content and catalog list image 4500, a catalog download button 4507 and a content download button 4508 are provided.

The catalog ID 4502 corresponds to the catalog ID 4102 of the content management table 410; the content ID 4504 corresponds to the content ID 4101 of the content management table 410; and the description of content 4506 corresponds to the description of content 4103 of the content management table 410. The download counts 4503 and 4505 are the values counted by the content management server 4.

Next, at Step S24 in FIG. 17, the user clicks one or more selection checkboxes 4501 in the content and catalog list image 4500 with the input/output device 84 of the web client computer 8 to select one or more catalogs 420. When the user clicks the catalog download button 4507 with the input/output device 84 of the web client computer 8, the web client computer 8 sends a request to acquire catalogs including the catalog IDs 4502 to the content management server 4 (S25).

The content management server 4 that has received the request to acquire catalogs sends the catalogs 420 identified by the received catalog IDs to the web client computer 8 (S26). The web client computer 8 acquires the catalogs 420 received from the content management server 4 (S27). The web client computer 8 transfers the downloaded catalogs 420 to the content evaluation server 7 to store them.

Through the foregoing processing, the web client computer 8 acquires one or more catalogs 420 from the content management server 4 and stores them in the content evaluation server 7.

Figure 18:
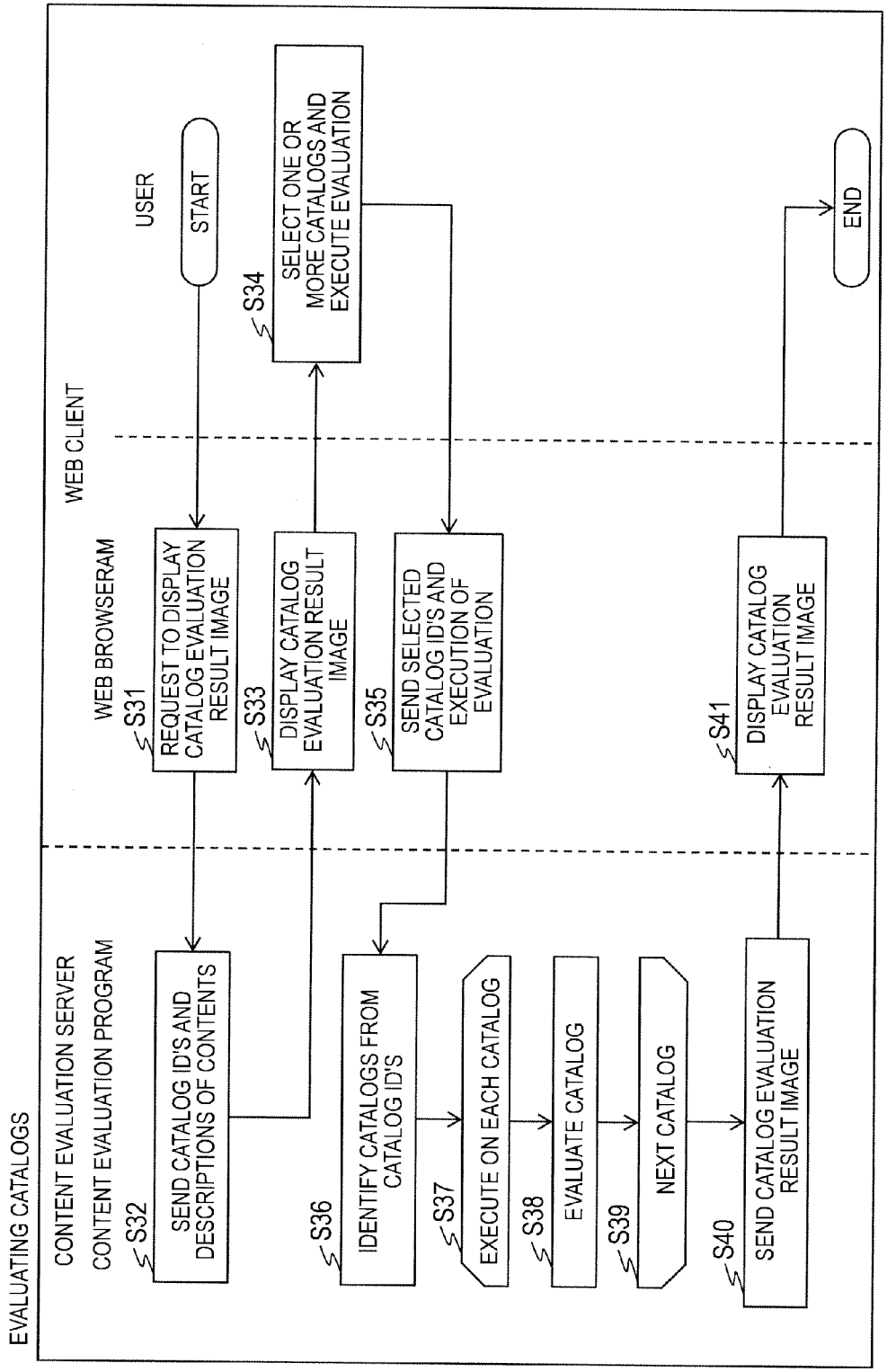
FIG. 18 is a flowchart illustrating an example of the processing performed in the user site to evaluate one or more operation contents of this invention.

FIG. 18 is a flowchart illustrating an example of the processing performed in the user site to evaluate one or more operation contents 400. Hereinafter, the processing of the content evaluation server 7 to evaluate the operation contents 400 in the catalogs 420 downloaded in FIG. 17 is described. This processing is started by the user of the web client computer 8.

Based on the user's instruction, the web client computer 8 sends a request to display a catalog evaluation result image to the content evaluation server 7 (S31). The content evaluation server 7 sends information such as the catalog IDs, the descriptions of the contents, and the like acquired from the catalogs 420 held in the memory device 72 or the storage device 75 (S32).

Figure 25:
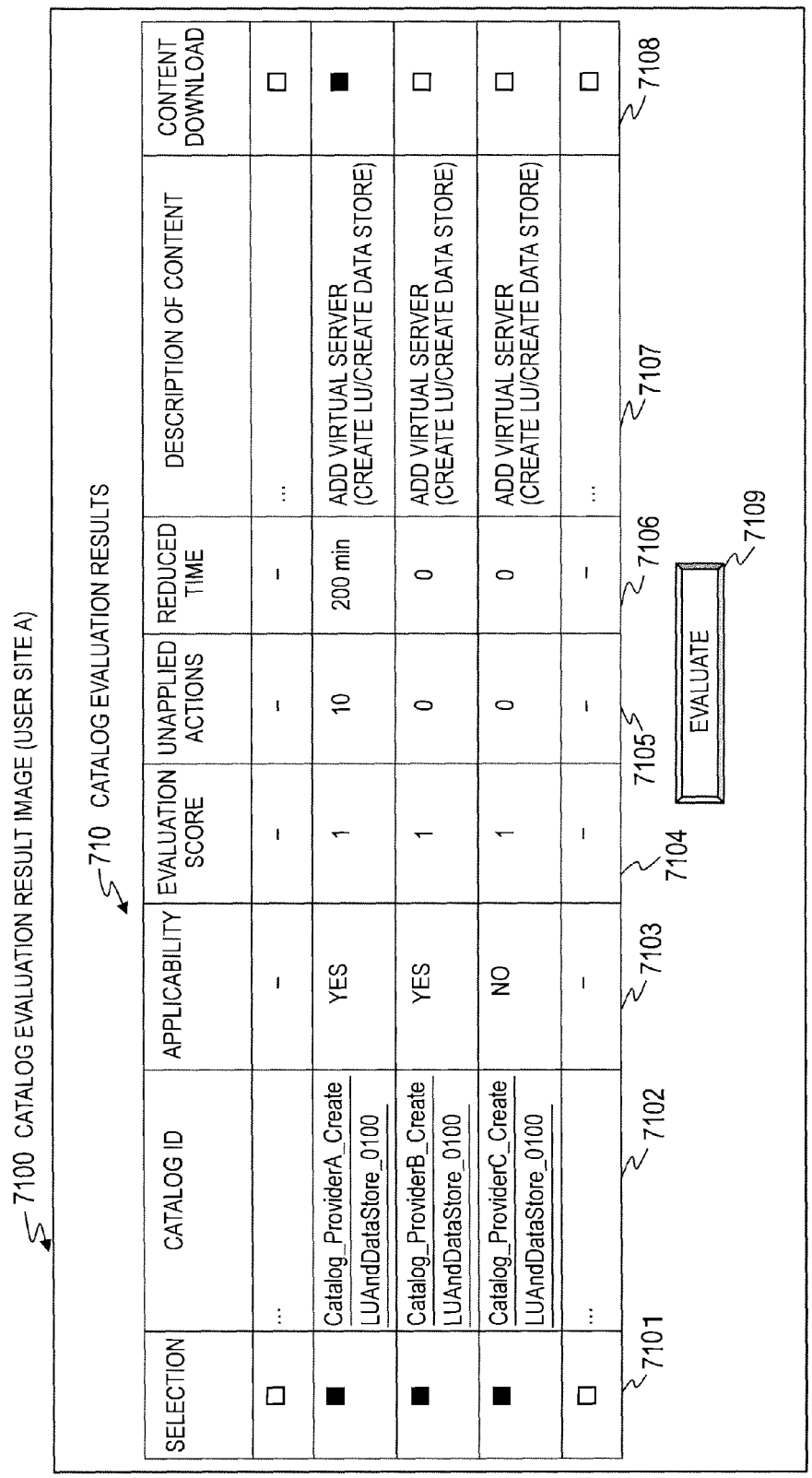
FIG. 25 is a screen image showing an example of the catalog evaluation result image for the user site A of this invention.

The web client computer 8 displays a catalog evaluation result image 7100 shown in FIG. 25 on the input/output device 84 based on the information of the catalogs 420 received from the content evaluation server 7 (S33). At this time, the results of evaluation have not been created yet and the catalog evaluation result image 7100 is used to select catalog IDs.

FIG. 25 is a screen image showing an example of the catalog evaluation result image for the user site A. The catalog evaluation result image 7100 is an image showing later-described catalog evaluation results 710 on the input/output device 84 of the web client computer 8.

The catalog evaluation results 710 include a selection checkbox 7101, a catalog ID 7102, an applicability 7103 of a result of evaluation, an evaluation score 7104 of a result of evaluation, unapplied actions 7105 of a result of evaluation, a reduced time 7106 of a result of evaluation, a description of content 7107 indicating the general description of the content associated with the catalog 420, and a download button 7108 for downloading the content in each entry. On the lower part of the catalog evaluation result image 7100, an evaluate button 7109 is provided.

Before execution of evaluation, the catalog ID 7102 in FIG. 25 corresponds to the catalog ID 4201 in the catalogs 420 shown in FIG. 10 and the description of content 7107 corresponds to the description of content 4203 in the catalogs 420.

The applicability 7103 in a catalog evaluation result 710 indicates a result of evaluation at the content evaluation server 7 about whether the content is applicable to the computer resources 10 in the user site 6. YES represents that the content is applicable and NO represents that the content is inapplicable. The evaluation score 7104 indicates a result of evaluation at the content evaluation server 7 about the evaluation point when the content is executed. The unapplied actions 7105 indicate a result of evaluation at the content evaluation server 7 about the number of manual actions or the man-hour that can be automated when the content is executed. The reduced time 7106 indicates a result of evaluation at the content evaluation server 7 about the time that can be reduced from the time taken by manual actions when the content 400 associated with the catalog 420 is executed. The content download 7108 is associated with the content ID 4101 in the content management table 410, which is associated with the catalog ID 7102, and is a button to download the operation content 400 having the content ID 4101 from the content management server 4. Before the content evaluation server 7 executes evaluation, the applicability 7103, the evaluation score 7104, the unapplied actions 7105, the reduced time 7106, and the content download 7108 are empty.

At Step S34 in FIG. 18, the user of the web client computer 8 selects one or more catalog IDs on which the user wants evaluation from the catalog IDs 7102 shown on the input/output device 84 and clicks the checkboxes 7101 of the catalog IDs. FIG. 18 shows an example that the blacked checkboxes for three catalog IDs 7102 have been selected. When the user of the web client computer 8 clicks the evaluate button 7109, evaluation is started at the content evaluation server 7 (S34).

The web client computer 8 sends the one or more catalog IDs 7102 selected by the checkboxes 7101 and an instruction to execute evaluation to the content evaluation server 7 (S35). Upon receipt of the catalog IDs and the instruction to execute evaluation from the web client computer 8, the content evaluation server 7 identifies the catalog IDs to be evaluated (S36).

The content evaluation server 7 sequentially performs evaluation on the identified catalog IDs in accordance with the loop of Steps S37 to S39. Step S38 to evaluate a catalog 420 will be described later.

Upon completion of evaluation on all the catalogs 420 to be evaluated, the content evaluation server 7 sends catalog evaluation results 710 which are an aggregation of evaluation results to the web client computer 8 (S40).

Figure 26:
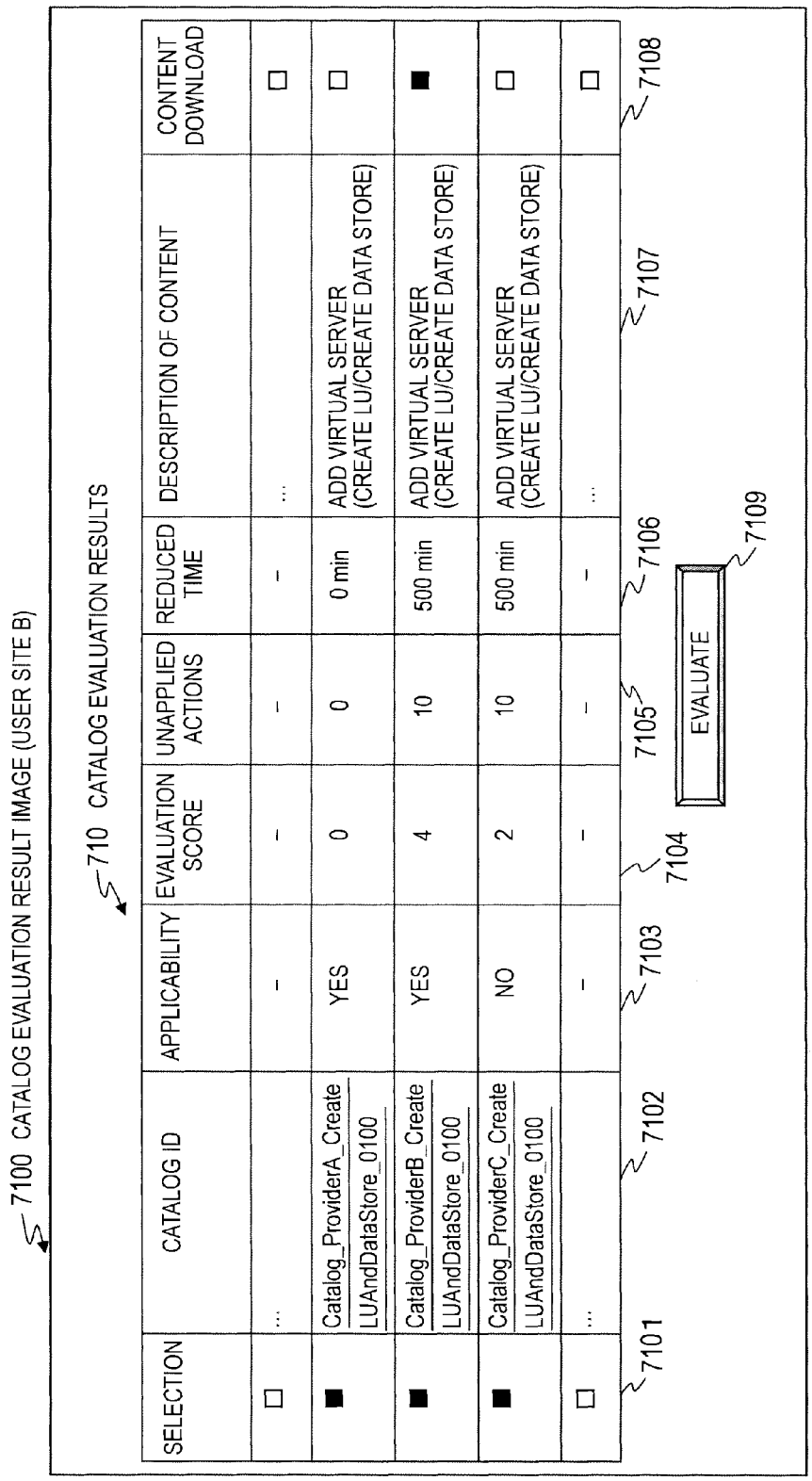
FIG. 26 is a screen image showing an example of the catalog evaluation result image for the user site B of this invention.

The web client computer 8 outputs the received catalog evaluation results 710 to the input/output device 84 as shown in FIG. 25 or 26.

Through the foregoing processing, the content evaluation server 7 performs evaluation on one or more catalog IDs 7102 selected by the user of the web client computer 8 about applicability to the computer resources 10 and effects, and displays the results of evaluation on the web client computer 8. This processing enables the determination whether an operation content 400 is applicable without actual execution of the operation content 400 on the computer resource 10.

Figure 19:
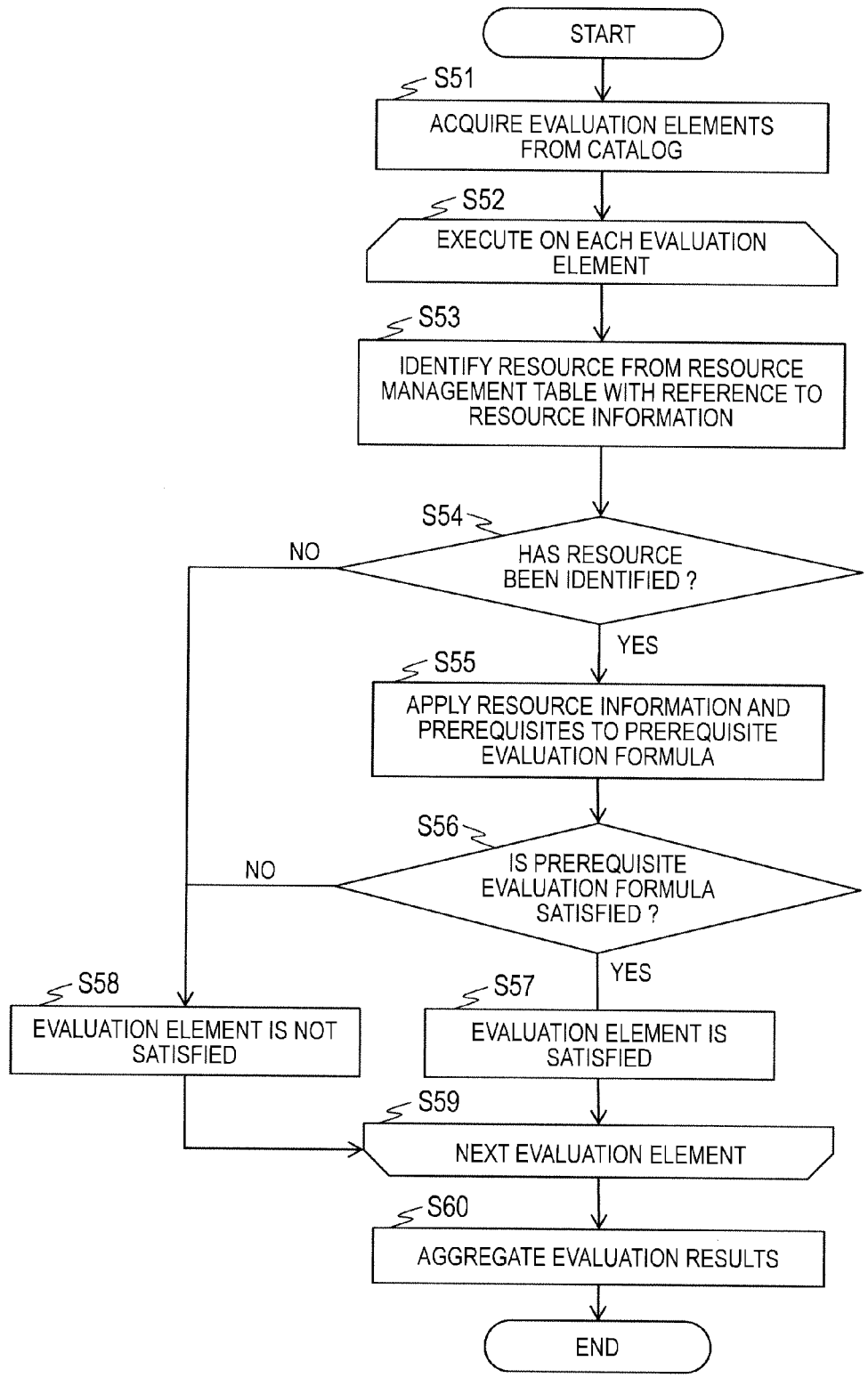
FIG. 19 is a flowchart illustrating an example of processing performed in the content evaluation server to evaluate a catalog of this invention.

FIG. 19 is a flowchart illustrating an example of processing performed in the content evaluation server 7 to evaluate a catalog 420. This flowchart illustrates details of the processing of the content evaluation program 77 to evaluate the catalog 420 at Step S38 in FIG. 18.

The content evaluation program 77 acquires one or more catalog IDs 4201 selected in FIG. 18 (S51) and acquires evaluation elements 4204 associated with each catalog 420. In the following description, the loop from Step S52 to Step S59 is performed on each selected evaluation element.

At Step S53, the content evaluation program 77 identifies the resource included in the entry of the resource information 42011 in the evaluation elements 4204 (refer to FIG. 11) from the resource types 702 in the resource management table 700 shown in FIG. 14. This corresponds to check whether the resource required by the evaluation elements 4204 in the catalog 420 matches a computer resource 10 in the user site 6.

At Step S54, if the resource information in the evaluation elements 4204 matches a resource type 702 in the resource management table 700, the content evaluation program 77 determines that the resource has been identified and proceeds to Step S55. If the resource information in the evaluation elements 4204 does not match any resource type 702 in the resource management table 700, the content evaluation program 77 determines that there is no match in the resources and proceeds to Step S58.

At Step S55, the content evaluation program 77 compares the resource type 702 and the resource information 703 in the resource management table 700 with the prerequisite evaluation formula 42012 on the prerequisites 1 to 3 (42013 to 42015) provided in the evaluation elements 4204.

At Step S55, the content evaluation program 77 determines whether the resource in the resource management table 700 satisfies the prerequisite evaluation formula 42012. If the resource satisfies the formula, the content evaluation program 77 proceeds to Step S57 and if not, it proceeds to Step S57.

At Step S57, the content evaluation program 77 evaluates that the present evaluation element 4204 in the catalog 420 is satisfied with the computer resource 10 in the user site 6.

At Step S58, on the other hand, the content evaluation program 77 evaluates that the operation content 400 for which the present evaluation element 4204 in the catalog 420 is provided is applicable to the computer resource 10 in the user site 6.

After performing the processing of the foregoing Steps S52 to S58 on all the evaluation elements 4204 at Step S59, the content evaluation program 77 aggregates evaluations on all the evaluation elements 4204 at Step S60. In the aggregation, the content evaluation program 77 places an evaluation result to the applicability 7102 for the catalog ID 4201 in the catalog evaluation results 710 shown in FIG. 25 or 26.

Through the foregoing processing, whether the operation contents 400 associated with one or more catalog IDs 4102 are applicable to the computer resources 10 in the user site 6 can be determined by comparing the evaluation elements 4204 of the catalog IDs 4201 with the resource management table 700.

Figure 20:
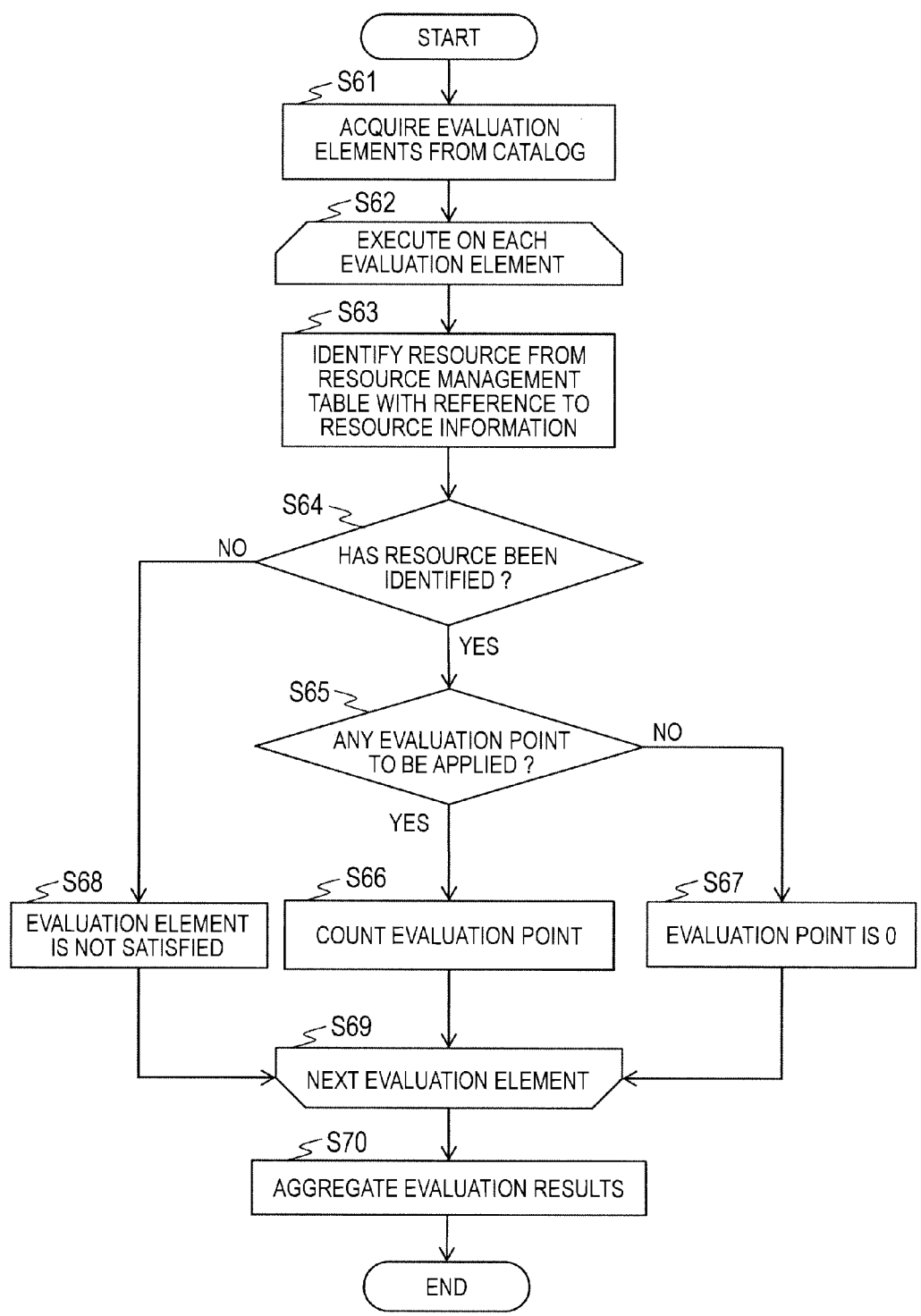
FIG. 20 is a flowchart illustrating an example of processing performed in the content evaluation server to evaluate a catalog of evaluation points of this invention.

FIG. 20 is a flowchart illustrating an example of processing performed in the content evaluation server 7 to evaluate a catalog in consideration of evaluation points. This flowchart illustrates details of the processing of the content evaluation program 77 to evaluate a catalog 420 at Step S38 in FIG. 18. Alternatively, this flowchart may be executed after the foregoing processing of evaluation in FIG. 19.

The content evaluation program 77 acquires one or more catalog IDs 4201 selected in FIG. 18 (S61) and acquires evaluation elements 4204 associated with each catalog 420. In the following description, the loop from Step S62 to Step S69 is performed on each selected evaluation element.

At Step S63, the content evaluation program 77 identifies the resource included in the entry of the resource information 42011 in the evaluation elements 4204 (refer to FIG. 11) from the resource types 702 in the resource management table 700 shown in FIG. 14. This corresponds to check whether the resource required by the evaluation elements 4204 in the catalog 420 matches a computer resource 10 in the user site 6.

At Step S64, if the resource information in the evaluation elements 4204 matches a resource type 702 in the resource management table 700, the content evaluation program 77 determines that the resource has been identified and proceeds to Step S65. If the resource information in the evaluation elements 4204 does not match any resource type 702 in the resource management table 700, the content evaluation program 77 determines that there is no match in the resources and proceeds to Step S68.

At Step S65, the content evaluation program 77 determines whether the evaluation elements 4204 include a resource provided with an evaluation point 42016 (>0). If the resource is provided with an evaluation point 42016, the content evaluation program 77 proceeds to Step S66 and if not, it proceeds to Step S67.

At Step S66, the content evaluation program 77 calculates the evaluation point 42016 in the evaluation elements 4204.

At Step S67, the content evaluation program 77 determines that the evaluation point 42016 is 0. At Step S68, the content evaluation program 77 evaluates that the evaluation elements 4204 are inapplicable to the computer resources 10 since the computer resource 10 in the user site 6 do not satisfy the evaluation element 4204.

After performing the processing of the foregoing Steps S62 to S68 on all the evaluation elements 4204 at Step S69, the content evaluation program 77 aggregates the evaluation points in the evaluation elements 4204 at Step S70. In the aggregation, the content evaluation program 77 places an evaluation result to the evaluation score 7104 for the catalog ID 4201 in the catalog evaluation results 710 shown in FIG. 25 or 26.

After the foregoing processing, if operation contents 400 associated with the evaluation elements 4204 of one or more catalog IDs 4201 are applicable to the computer resources 10 in the user site 6, a catalog ID 4201 or an operation content 400 that has advantageous effects of automated actions can be determined in view of the sum of the evaluation points 42016.

Specifically, a case is described in which evaluation results shown in FIG. 26 are obtained after comparison of operation contents A to C in FIGS. 6 to 8. In FIG. 26, the catalog ID 7102="Catalog_ProviderA_CreateLUAnd-DataStore_0100" represents the content A in FIG. 6; the catalog ID 7102="Catalog_ProviderB_CreateLUAnd-DataStore_0100" represents the content B in FIG. 7; and the catalog ID 7102="Catalog_ProviderC_CreateLUAnd-DataStore_0100" represents the content C in FIG. 8.

According to the evaluation results of FIG. 26, the contents A and B showing YES in the applicability 7103 are applicable to the computer resources 10 in the user site 6. Next, regarding the evaluation score 7104, the operation content A shows 0 and the operation content B shows 4. Accordingly, the user of the web client computer 8 can easily determine that the operation content B having a higher evaluation score 7104 is more effective for the computer resources 10 in the user site 6.

Figure 21:
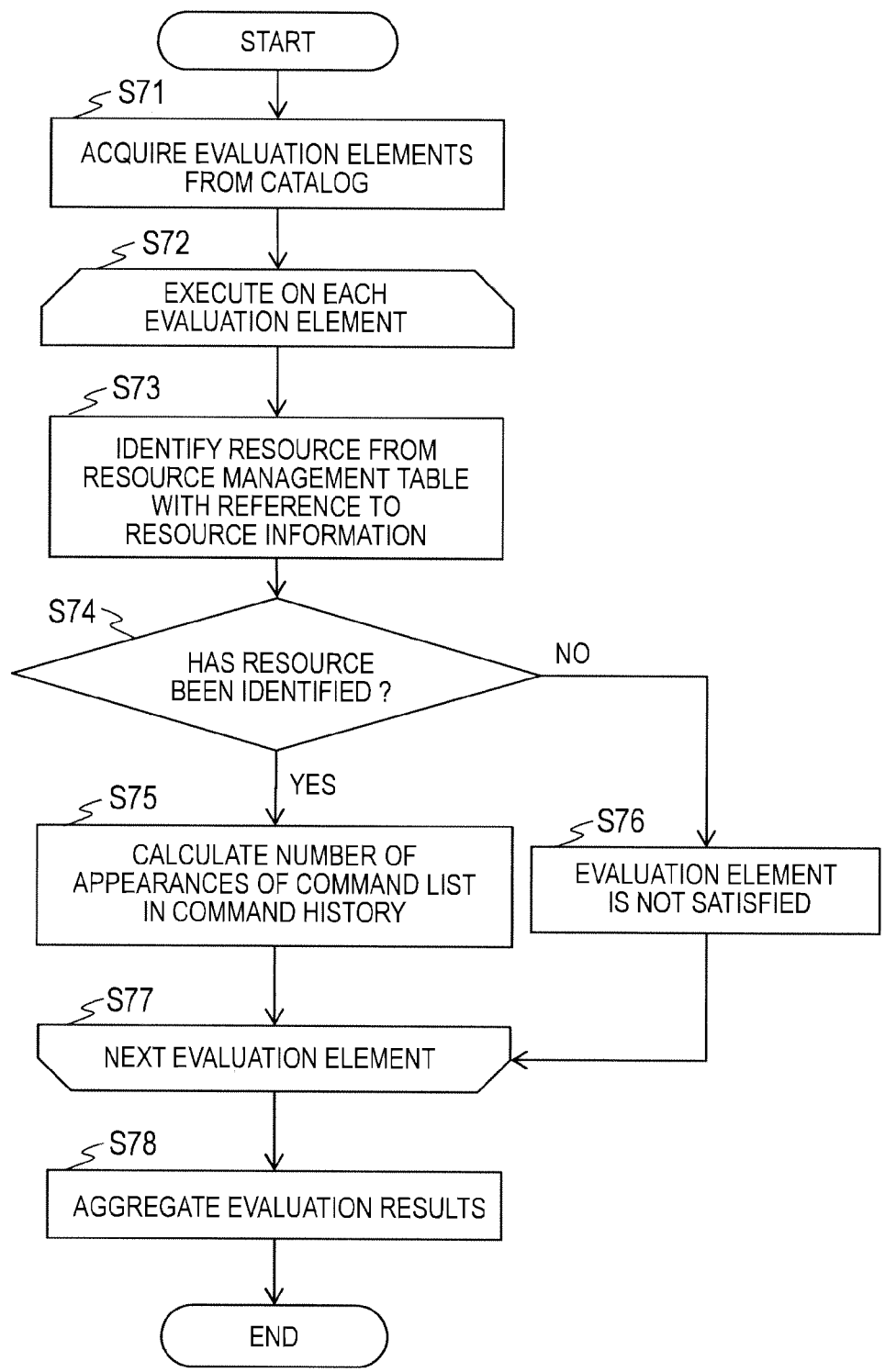
FIG. 21 is a flowchart illustrating an example of processing performed in the content evaluation server to evaluate a catalog with respect to the operation of this invention.

FIG. 21 is a flowchart illustrating an example of processing performed in the content evaluation server 7 to evaluate a catalog 420 with respect to the time. This flowchart illustrates details of the processing of the content evaluation program 77 to evaluate a catalog 420 at Step S38 in FIG. 18. Alternatively, this flowchart may be executed after the foregoing processing of evaluation in FIG. 19.

The content evaluation program 77 acquires one or more catalog IDs 4201 selected in FIG. 18 (S71) and acquires evaluation elements 4204 associated with each catalog 420. In the following description, the loop from Step S72 to Step S79 is performed on each selected evaluation element.

At Step S73, the content evaluation program 77 identifies the resource included in the entry of the resource information 42011 in the evaluation elements 4204 (refer to FIG. 11) from the resource types 702 in the resource management table 700 shown in FIG. 14. This corresponds to check whether the resource required by the evaluation elements 4204 in the catalog 420 matches a computer resource 10 in the user site 6.

At Step S74, if the resource information in the evaluation elements 4204 matches a resource type 702 in the resource management table 700, the content evaluation program 77 determines that the resource has been identified and proceeds to Step S75. If the resource information in the evaluation elements 4204 does not match any resource type 702 in the resource management table 700, the content evaluation program 77 determines that there is no match in the resources and proceeds to Step S76.

At Step S75, the content evaluation program 77 compares the command list 42017 in the evaluation elements 4204 with the command history 704 in the resource management table 700 and determines the number of appearances of the command list 42017 in the evaluation elements 4204 in the command history 704.

At Step S76, on the other hand, the content evaluation program 77 evaluates that the evaluation elements 4204 are inapplicable to the computer resources 10 since the computer resource 10 in the user site 6 does not satisfy the evaluation element 4204.

At Step S78, after performing the processing of the foregoing Steps S72 to S77 on all the evaluation elements 4204, the content evaluation program 77 aggregates the numbers of appearances of the command lists in the evaluation elements 4204. In the aggregation, the content evaluation program 77 places an evaluation result (the number of appearances) to the unapplied actions 7105 for the catalog ID 4201 in the catalog evaluation results 710 shown in FIG. 25 or 26.

Through the foregoing processing, a catalog ID 4201 or an operation content 400 that has advantageous effects can be determined in view of the numbers of appearances of command lists, in addition to determining whether the evaluation elements 4204 for one or more catalog IDs 4201 are applicable to the computer resources 10 in the user site 6.

The situation that a command history 704 includes a command list 42017 in the evaluation elements 4204 indicates that the actions can be automated by executing the operation content 400 associated with the catalog 420; the number of appearances can be a reference to reduce the cost required for the management and maintenance by the automation.

Specifically, a case is described in which evaluation results shown in FIG. 25 are obtained after comparison of operation contents A to C in FIGS. 6 to 8. In FIG. 25, the catalog ID 7102="Catalog_ProviderA_CreateLUAndDataStore_0100" represents the content A in FIG. 6; the catalog ID 7102="Catalog_ProviderB_CreateLUAndDataStore_0100" represents the content B in FIG. 7; and the catalog ID 7102="Catalog_ProviderC_CreateLUAndDataStore_0100" represents the content C in FIG. 8.

According to the evaluation results of FIG. 25, the contents A and B showing YES in the applicability 7103 are applicable to the computer resources 10 in the user site 6. Next, regarding the evaluation score 7104, there is no difference since the operation content A shows 1 and the operation content B shows 1.

Next, regarding the unapplied actions 7105, the operation content A shows 10 and the operation content B shows 0. This indicates that the operation content A can automate 10 commands that have been performed manually. The user of the web client computer 8 can easily determine that the operation content A showing a higher value in the unapplied actions 7105 is more effective for the computer resources 10 in the user site 6.

Figure 22:
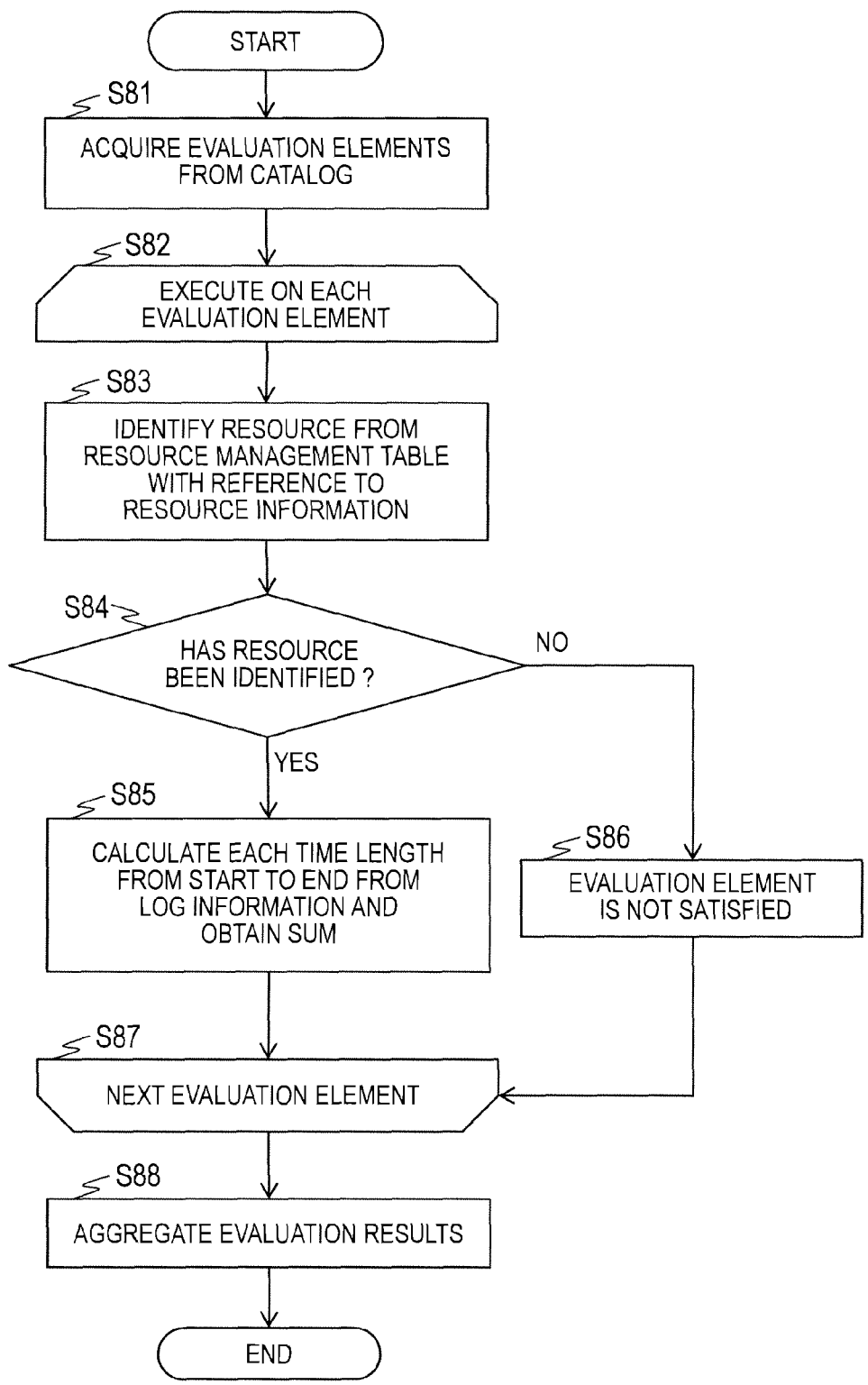
FIG. 22 is a flowchart illustrating an example of processing performed in the content evaluation server to evaluate a catalog with respect to the time of this invention.

FIG. 22 is a flowchart illustrating an example of processing performed in the content evaluation server 7 to evaluate a catalog 420 with respect to the time. This flowchart illustrates details of the processing of the content evaluation program 77 to evaluate the catalog 420 at Step S38 in FIG. 18. Alternatively, this flowchart may be executed after the foregoing processing of evaluation in FIG. 19.

The content evaluation program 77 acquires one or more catalog IDs 4201 selected in FIG. 18 (S81) and acquires evaluation elements 4204 associated with each catalog 420. In the following description, the loop from Step S82 to Step S89 is performed on each selected evaluation element.

At Step S83, the content evaluation program 77 identifies the resource included in the entry of the resource information 42011 in the evaluation elements 4204 (refer to FIG. 11) from the resource types 702 in the resource management table 700 shown in FIG. 14. This corresponds to check whether the resource required by the evaluation elements 4204 in the catalog 420 matches a computer resource 10 in the user site 6.

At Step S84, if the resource information in the evaluation elements 4204 matches a resource type 702 in the resource management table 700, the content evaluation program 77 determines that the resource has been identified and proceeds to Step S85. If the resource information in the evaluation elements 4204 does not match any resource type 702 in the resource management table 700, the content evaluation program 77 determines that there is no match in the resources and proceeds to Step S86.

At Step S85, the content evaluation program 77 compares the command list 42017 in the evaluation elements 4204 with the command history 704 in the resource management table 700. If the command list 42017 in the evaluation elements 4204 is included in the command history 704, the content evaluation program 77 calculates the time length in the case where the command list 42017 is manually performed from the log information 705 in the resource management table 700. In other words, the content evaluation program 77 calculates the time length in the case where the command list 42017 is manually performed from the start time to the completion time of the commands in the command list 42017.

At Step S86, on the other hand, the content evaluation program 77 evaluates that the evaluation elements 4204 are inapplicable to the computer resources 10 since the computer resource 10 in the user site 6 does not satisfy the evaluation elements 4204.

At Step S88, after performing the processing of the foregoing Steps S82 to S87 on all the evaluation elements 4204, the content evaluation program 77 calculates the difference between the sum of the time lengths in the case where the command lists in the evaluation elements 4204 are manually performed and the sum of the time information 42018 in the evaluation elements 4204 as a time that can be reduced for each evaluation element 4204 to aggregate it as a reduced time.

In this aggregation, the content evaluation program 77 places the time that can be reduced of an evaluation result to the reduced time 7106 for the catalog ID 7102 in the catalog evaluation results 710 shown in FIG. 25 or 26.

That is to say, the effect of reduction in the cost (time) required for operations or maintenance can be ascertained by deducting the execution time in the case of the automated operation content 400 having an catalog ID 4201 from the execution time in the case of manual actions corresponding to the command lists.

The above-described FIG. 20 provides an example of calculating an effect of an operation content 400 associated with a catalog 420 by the evaluation point 42016 in the evaluation elements 4204; FIG. 21 provides an example of calculating an effect of an operation content 400 by the number of appearances of the command list 42017 in the evaluation elements 4204; and FIG. 22 provides an example of calculating an effect of an operation content 400 by the difference between the time required to manually perform the actions of the command list 42017 in the evaluation elements 4204 and the time required to perform the same by an automated operation content. The processing of FIGS. 20 to 22 performed after the processing of FIG. 19 enables evaluation with respect to all of the evaluation point 42016, the number of appearances of command list 42017, and execution time.

Specifically, a case is described in which evaluation results shown in FIG. 25 are obtained after comparison of operation contents A to C in FIGS. 6 to 8. In FIG. 25, the catalog ID 7102="Catalog_ProviderA_CreateLUAndDataStore_0100" represents the content A in FIG. 6; the catalog ID 7102="Catalog_ProviderB_CreateLUAndDataStore_0100" represents the content B in FIG. 7; and the catalog ID 7102="Catalog_ProviderC_CreateLUAndDataStore_0100" represents the content C in FIG. 8.

According to the evaluation results of FIG. 25, the contents A and B showing YES in the applicability 7103 are applicable to the computer resources 10 in the user site 6. Next, regarding the evaluation score 7104, there is no difference since the operation content A shows 1 and the operation content B shows 1.

Regarding the reduced time 7106, the operation content A shows 200 minutes and the other catalog IDs shows 0. The user of the web client computer 8 can easily determine that the operation content A is more effective.

Regarding the unapplied actions 7105, the operation content A shows 10 and the operation content B shows 0. This indicates that the operation content A can automate 10 commands that have been performed manually. The user of the web client computer 8 can easily determine that the operation content A showing a higher value in the unapplied actions 7105 is more effective for the computer resources 10 in the user site 6.

Figure 23:
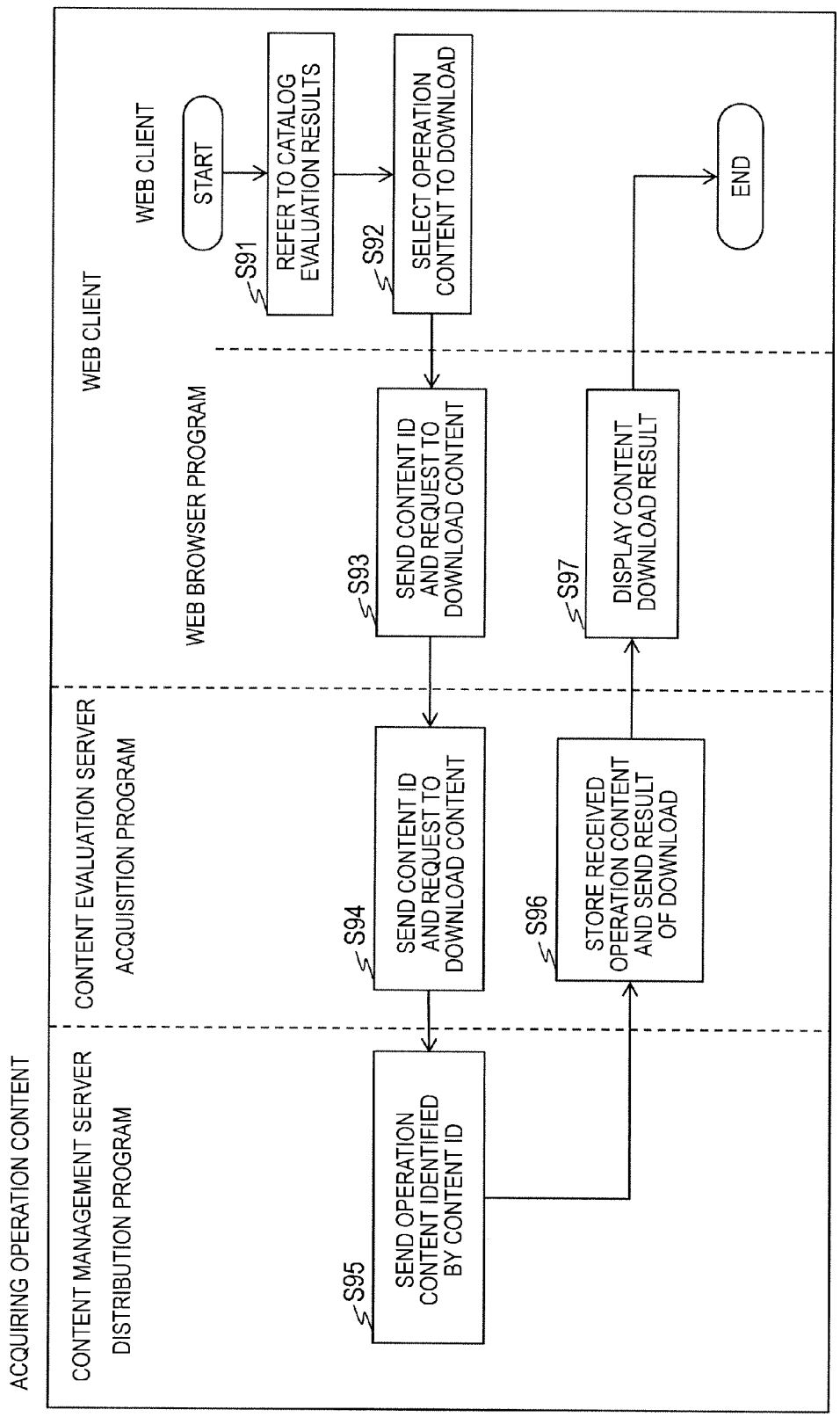
FIG. 23 is a flowchart illustrating an example of the processing for the web client computer 8 to download an operation content of this invention.

FIG. 23 is a flowchart illustrating an example of the processing for the web client computer 8 to download an operation content. This corresponds to the processing to download an operation content 400 from the catalog evaluation result image 7100 shown in FIG. 25 or 26 at the step S41 of FIG. 18 after performing the evaluation of the foregoing FIGS. 19 to 22.

First, the user of the web client computer 8 refers to the catalog evaluation result image 7100 (S91) and selects a content download button 7108 with the input/output device 84 (S92). The web browser program 86 receives the content ID associated with the content download button 7108 through the input/output device 84. The web browser program 86 sends the content ID and the download request to the content evaluation server 7 (S93). In the catalog evaluation result images 7100 shown in FIGS. 25 and 26, the content download buttons 7108 are associated or linked with the content IDs 4202 in advance.

Upon receipt of the content ID 7102 and the download request from the web client computer 8, the acquisition program 76 in the content evaluation server 7 transfers the content ID and the download request to the content evaluation server 7 (S94).

Upon receipt of the content ID 7102 and the download request from the content evaluation server 7, the distribution program 430 in the content management server 4 sends the operation content 400 identified by the content ID to the content evaluation server 7 (S95).

The content evaluation server 7 stores the operation content 400 received from the content management server 4 and sends a result of download of the operation content 400 to the web client computer 8 (S96). The web client computer 8 sends the received result of download of the operation content 400 to the input/output device 84 and terminates the processing.

Through the foregoing processing, the user who sees the catalog evaluation result image 7100 displayed on the input/output device 84 of the web client computer 8 can acquire an operation content 400 suitable for the computer resources 10 in the user site 6. Furthermore, the content evaluation server 7 registers the information on the downloaded operation content 400 in the content management table 410A.

Figure 24:
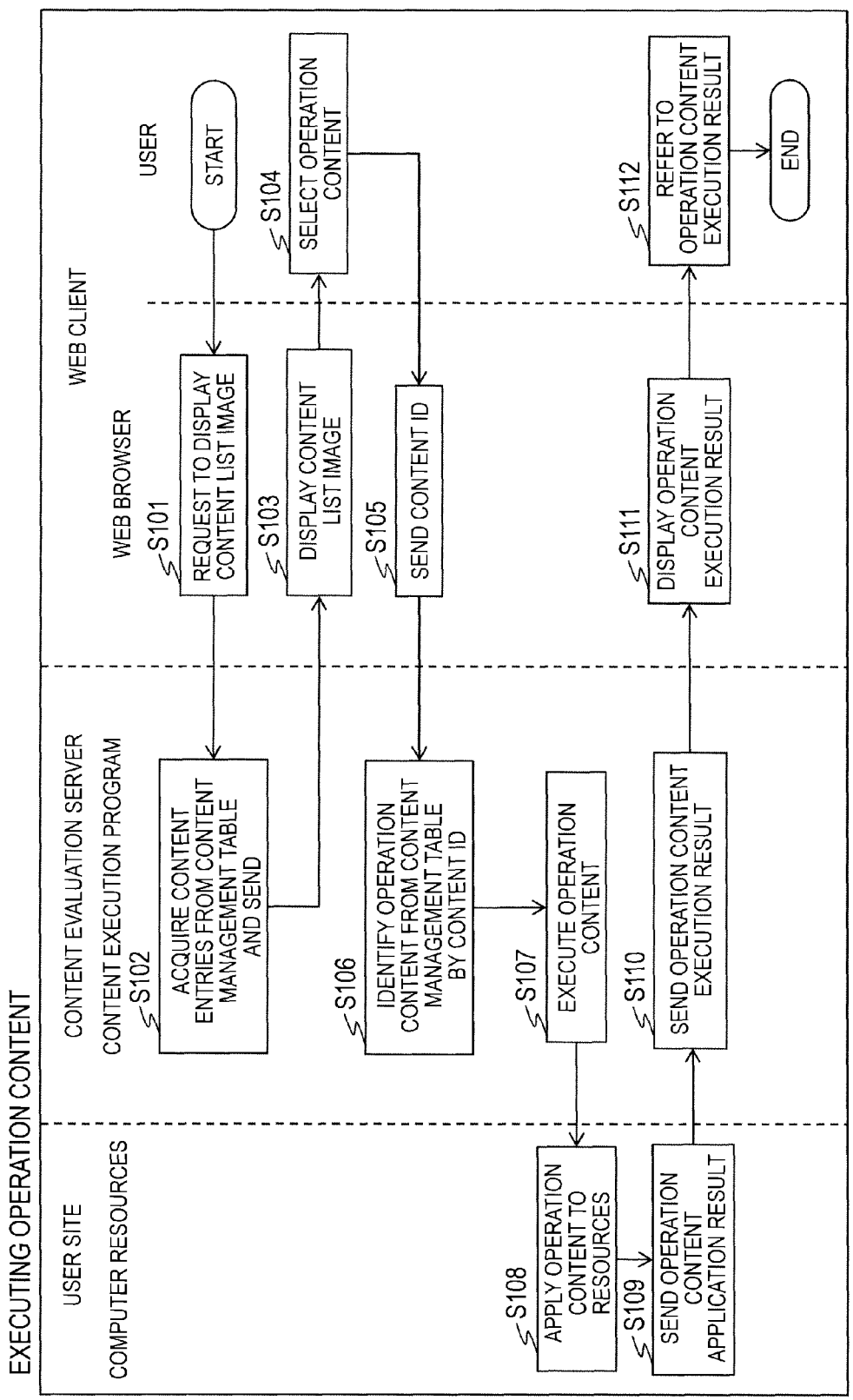
FIG. 24 is a flowchart of an example of the processing of the web client computer 8 to execute a content on the computer resources of this invention.

FIG. 24 is a flowchart of an example of the processing of the web client computer 8 to execute a content on the computer resources 10.

Through the foregoing processing of FIG. 23, an operation content 400 selected by the user of the web client computer 8 is stored in the content evaluation server 7. The user of the web client computer 8 requests the content and catalog list image 4500 through the input/output device 84. The web browser program 86 in the web client computer 8 sends a request to display the content and catalog list image 4500 to the content evaluation server 7 (S101).

Upon receipt of the request to display the content and catalog list image 4500, the content execution program 78 in the content evaluation server 7 selects a predetermined number of records from the content management table 410A and sends them to the web client computer 8 (S102).

The web browser program 86 in the web client computer 8 displays the records selected from the content management table 410A and received from the content evaluation server 7 on the input/output device 84 as the content and catalog list image 4500 as shown in FIG. 27 (S103).

The user selects a content ID 4504 with the input/output device 84 to select an operation content to execute (S104). The web browser program 86 sends the selected content ID 4504 to the content evaluation server 7 and requests to execute the content (S105).

The content evaluation server 7 identifies the operation content 400 from the content management table 410A by the received content ID (S106). The content evaluation server 7 executes the identified operation content 400 (S107). The content evaluation server 7 applies the operation content 400 to the computer resources 10 (S108). That is to say, the content evaluation server 7 controls the computer resources 10 based on the script and the command lists as shown in FIGS. 6 to 8. Upon completion of the execution of the operation content 400, a result of application of the operation content 400 is sent from the computer resources 10 to the content evaluation server 7 (S109).

The content evaluation server 7 sends the received result of execution of the operation content 400 to the web client computer 8 (S110). The web browser program 86 in the web client computer 8 displays the received result of execution of the operation content 400 on the input/output device 84 and terminates the processing.

Through the foregoing processing, an operation content 400 that has been evaluated with the catalog 420 in advance can be executed. This invention achieves determination whether an operation content 400 is applicable to the computer resources 10 in the user site 6 by evaluating a catalog 420 associated with the operation content 400 without actually executing the operation content 400. The evaluation enables quick and easy selection of an operation content 400 applicable to the computer resources 10 in the user site 6 from a large number of operation contents 400, so that the cost for the operations and management of the user site 6 can be reduced.

The above-described embodiment has provided an example in which the content evaluation server 7 in each user site 6 is the management computer for the computer resources 10, but a user site 6 may include a management computer for the computer resources 10 and additionally include a content evaluation server 7.

The above-described embodiment has provided an example in which the web client computer 8 in each user site 6 sends requests and instructions to the content evaluation server 7 and the content management server 4, but those requests and instructions may be input through the input/output device 74 of the content evaluation server 7.

The computers, processing units, and processing means described related to this invention may be, for a part or all of them, implemented by dedicated hardware.

The variety of software exemplified in the embodiment can be stored in various media (for example, non-transitory storage media), such as electro-magnetic media, electronic media, and optical media and can be downloaded to a computer through communication network such as the Internet.

This invention is not limited to the foregoing embodiment but includes various modifications. For example, the foregoing embodiment has been provided to explain this invention to be easily understood; it is not limited to the configurations including all the described elements.

<Supplement>

16. A content evaluation server comprising:
 a processor; and
 storage resources holding resource management information including configuration information collected from the computer resources under management of the content evaluation server and a content evaluation program for evaluating a catalog associated with an operation content,
  wherein the content evaluation program is configured to:
  acquire catalogs associated one-to-one with operation contents from the content management server, each of the catalogs including prerequisites for executing an operation content and evaluation elements for the operation content;
  select a catalog associated with the operation content to be evaluated from the catalogs; and
  evaluate the operation content by comparing the selected catalog with the resource management information.

17. A content management server comprising:
 a processor; and
 storage resources holding operation contents, catalogs associated with the operation contents, content management information for managing the operation contents and the catalogs, and a distribution program for distributing the operation contents and the catalogs.

18. A non-transitory computer-readable storage medium including a program for distributing operation contents for controlling computer resources from a content management server including a processor and storage resources, the program being to cause the content management server to execute:
 a first step of registering the operation contents in association with the catalogs for evaluating the operation contents;
 a second step of registering the registered operation contents in association with the registered catalogs in content management information;
 a third step of receiving a request to send the catalogs and sending the catalogs;
 a third step of receiving a request to send one of the operation contents and an identifier of the one of the operation contents and sending the operation content.

19. A user site for evaluating an operation content for controlling computer resources, the user site comprising:
 a content evaluation server for evaluating an operation content, the content evaluation server including a processor, storage resources, and an interface and being connected with a content management server via the interface; and
 computer resources managed by the content evaluation server,
 wherein the content management server holds catalogs associated one-to-one with operation contents and each of the catalogs includes prerequisites for executing an operation content and evaluation elements for the operation content,
 wherein the content evaluation server holds configuration information collected from the computer resources managed by the content evaluation server in resource management information, and
 wherein the content evaluation server acquires the catalogs from the content management server, selects a catalog associated with the operation content to be evaluated from the catalogs, and evaluates the operation content by comparing the selected catalog with the resource management information.

What is claimed is:

1. An operation content evaluation system for evaluating an operation content for controlling computer resources, the operation content evaluation system comprising:
 a content site including a content management server for distributing operation contents for controlling computer resources; and
 a user site including a content evaluation server for evaluating one of the operation contents and computer resources managed by the content evaluation server, the content evaluation server including a processor, storage resources, and an interface and being connected with the content management server via the interface,
 wherein the content management server holds catalogs associated one-to-one with the operation contents and each of the catalogs includes prerequisites for executing an operation content and evaluation elements for the operation content,
 wherein the content evaluation server holds configuration information collected from the computer resources managed by the content evaluation server in resource management information,
 wherein the content evaluation server is configured to
  acquire the catalogs from the content management server,
  select a catalog associated with the operation content to be evaluated from the catalogs, and
  evaluate the operation content by comparing the selected catalog with the resource management information,
 wherein the evaluation elements in each of the catalogs include command lists for the resources included in the operation content,
 wherein, for each piece of the configuration information in the resource management information, the content evaluation server is configured to
  collect records of used commands as a command history and
  compare the command history with the command list of one of the evaluation elements in the catalog to calculate a number of a appearances of the command list in the command history as a value for evaluating operation content,
 wherein the evaluation elements in each of the catalogs include execution times required to execute the command lists for the resources included in the operation content,
 wherein, for each piece of the configuration information in the resource management information, the content evaluation server is configured to
  collect records of used commands as a command history;
  compare the command history with the command list of one of the evaluation elements in the catalog;
  calculate, when the command list appears in the command history, a time required to execute the command history as an manual execution time from log information acquired in advance; and
  calculate a value as a reduced time by deducting the execution time required to execute the command list from the manual execution time.

2. The operation content evaluation system according to claim 1,
 wherein the content evaluation server is configured to determine whether the operation content associated with the selected catalog is applicable to the computer resources managed by the content evaluation server by comparing the prerequisites in the selected catalog with the resource management information.

3. The operation content evaluation system according to claim 1,
wherein the evaluation elements in each of the catalogs include a numerical value for evaluating the operation content for each of the prerequisites, and
wherein the content evaluation server is configured to determine whether the operation content associated with the selected catalog is applicable to the computer resources managed by the content evaluation server by comparing the prerequisites in the selected catalog with the resource management information and aggregate the evaluation elements to calculate a numerical value for evaluating the operation content.

4. An operation content evaluation system for evaluating an operation content for controlling computer resources, the operation content evaluation system Comprising:
a content management server for distributing operation contents for controlling computer resources;
a content evaluation server for evaluating one of the operation contents, the content evaluation server including a processor, storage resources, and an interface and being connected with the content management server via the interface;
computer resources managed by the content evaluation server; and
a web client computer which is connected with the content evaluation server, sends instructions to the content evaluation server, and receives results of the instructions to output the results to an input/output device;
wherein the content management server holds catalogs associated one-to-one with the operation contents and each of the catalogs includes prerequisites for executing an operation content and evaluation elements for the operation content,
wherein the content evaluation server holds configuration information collected from the computer resources managed by the content evaluation server in resource management information,
wherein, based on instructions from the web client computer, the content evaluation server is configured to
acquire the catalogs from the content management server,
select a catalog associated with the operation content to be evaluated from the catalogs,
evaluate the operation content by comparing the selected catalog with the resource management information, and
send a result of the evaluation to the web client computer,
wherein the evaluation elements in each of the catalogs include command lists for the resources included in the operation content,
wherein, for each piece of the configuration information in the resource management information, the content evaluation server is configured to
collect records of used commands as a command history,
compare the command history with the command list of one of the evaluation elements in the catalog to calculate a number of appearances of the command list in the command history as a value for evaluating the operation content, and
send the value to the web client computer, wherein the evaluation elements in each of the catalogs include execution times required to execute the command lists for the resources included in the operation content,
wherein, for each piece of the configuration information in the resource management information, the content evaluation server is configured to
collect records of used commands as a command history;
compare the command history with the command list of one of the evaluation elements in the catalog;
calculate, when the command list appears in the command history, a time required to execute the command history as an manual execution time from log information acquired in advance;
calculate a value as a reduced time by deducting the execution time required to execute the command list from the manual execution time; and
send the reduced time to the web client computer.

5. The operation content evaluation system according to claim 4,
wherein the content evaluation server is configured to determine whether the operation content associated with the selected catalog is applicable to the computer resources managed by the content evaluation server by comparing the prerequisites in the selected catalog with the resource management information and send a result of the determination to the web client computer.

6. The operation content evaluation system according to claim 4,
wherein the evaluation elements in each of the catalogs include a numerical value for evaluating the operation content for each of the prerequisites, and
wherein the content evaluation server is configured to determine whether the operation content associated with the selected catalog is applicable to the computer resources managed by the content evaluation server by comparing the prerequisites in the selected catalog with the resource management information, aggregate the evaluation elements to calculate a numerical value for evaluating the operation content, and send the numerical value to the web client computer.

7. A non-transitory computer-readable storage medium including a program for evaluating an operation content for controlling computer resources in a management computer, the management computer including a processor and storage resources, and the program causing the management computer to execute:
a first step of holding configuration information collected from computer resources managed by the management computer in resource management information;
a second step of acquiring catalogs which are associated one-to-one with operation contents and each include prerequisites for executing an operation content and evaluation elements for the operation content;
a third step of selecting a catalog associated with the operation content to be evaluated from the catalogs;
a fourth step of evaluating the operation content by comparing the selected catalog with the resource management information,
wherein the evaluation elements in each of the catalogs include command lists for the resources included in the operation content,
a seventh step of, for each piece of the configuration information in the resource management information,
collecting records of used commands as a command history and comparing the command history with the command list of one of the evaluation elements in the catalog to calculate a number of appearances of the command list in the command history as a value for evaluating the operation content, and
wherein the evaluation elements in each of the catalogs include execution times required to execute the command lists for the resources included in the operation content,
an eighth step of for each piece of the configuration information in the resource management information,
   collecting records of used commands as a command history; comparing the command history with the command list of one of the evaluation elements in the catalog;
   calculating, when the command list appears in the command history, a time required to execute the command history as an manual execution time from log information acquired in advance; and
   calculating a value as a reduced time by deducting the execution time required to execute the command list from the manual execution time.

8. The storage medium according to claim 7, the program further causing the management computer to execute
   a fifth step of determining whether the operation content associated with the selected catalog is applicable to the computer resources managed by the management computer by comparing the prerequisites in the selected catalog with the resource management information.

9. The storage medium according to claim 7,
   wherein the evaluation elements in each of the catalogs include a numerical value for evaluating the operation content for each of the prerequisites,
   the program further causing the management computer to execute a sixth step of determining whether the operation content associated with the selected catalog is applicable to the computer resources managed by the management computer by comparing the prerequisites in the selected catalog with the resource management information and aggregating the evaluation elements to calculate a numerical value for evaluating the operation content.

* * * * *